United States Patent [19]

Clegg et al.

[11] E Patent Number: Re. 33,057

[45] Reissued Date of Patent: Sep. 12, 1989

[54] HIGH FREQUENCY SUPPLY SYSTEM FOR GAS DISCHARGE LAMPS AND ELECTRONIC BALLAST THEREFOR

[75] Inventors: John C. Clegg; Ariel R. Davis, both of Provo, Utah

[73] Assignee: Brigham Young University, Provo, Utah

[21] Appl. No.: 34,436

[22] Filed: Apr. 2, 1987

Related U.S. Patent Documents

Reissue of:

[64] Patent No.: 4,508,996
Issued: Apr. 2, 1985
Appl. No.: 373,994
Filed: May 3, 1982

U.S. Applications:

[63] Continuation-in-part of Ser. No. 161,914, Jun. 23, 1980, abandoned.

[51] Int. Cl.[4] ..... H05B 37/02

[52] U.S. Cl. ..... 315/224; 315/206; 315/219; 315/250; 315/288

[58] Field of Search ..... 307/157; 361/377; 315/184, 288, 324, 244, 201, 97

[56] References Cited

U.S. PATENT DOCUMENTS

| | | | |
|---|---|---|---|
| 335,060 | 0/1886 | Doubleday | 315/288 |
| 1,158,474 | 0/1915 | Fortescur | 363/3 |
| 1,158,477 | 11/1915 | Fortescue | 363/3 |
| 1,864,485 | 6/1932 | Eisenhaut | 315/288 |
| 2,103,950 | 12/1937 | Leukert | 363/2 |
| 2,146,571 | 2/1939 | Gunther | 307/147 |
| 2,964,676 | 12/1960 | Davies et al. | 315/DIG. 7 |
| 2,965,804 | 12/1960 | Roesel, Jr. et al. | 315/201 |
| 3,075,123 | 1/1963 | Faulds | 307/146 |
| 3,230,382 | 1/1966 | Burns et al. | 307/82 |
| 3,290,510 | 12/1966 | Rose | 307/147 |
| 3,396,307 | 8/1968 | Campbell . | |
| 3,474,256 | 10/1969 | Hawley | 307/18 |
| 3,521,120 | 7/1970 | Anderson | 315/57 |
| 3,579,026 | 5/1971 | Paget | 315/DIG. 7 |
| 3,703,677 | 11/1972 | Farrow | 315/DIG. 7 |
| 3,753,071 | 8/1973 | Engel et al. | 315/201 |
| 3,769,545 | 10/1973 | Crane | 315/DIG. 7 |
| 3,769,571 | 10/1973 | Wilkinson | 307/82 |
| 3,801,865 | 4/1974 | Roberts | 315/187 |
| 3,922,582 | 11/1975 | Pitel | 315/106 |
| 3,931,544 | 1/1976 | Pitel | 315/DIG. 7 |
| 4,001,571 | 1/1977 | Martin | 307/157 X |
| 4,004,185 | 1/1977 | Edmondson et al. | 315/105 |
| 4,005,335 | 1/1977 | Pepper | 315/224 |
| 4,008,414 | 2/1977 | Agnew | 315/97 |
| 4,019,115 | 4/1977 | Lips | 307/82 |
| 4,042,852 | 8/1977 | Zaderej et al. | 315/97 |
| 4,045,711 | 8/1977 | Pitel | 315/209 |
| 4,053,813 | 10/1977 | Kornrumph | 315/206 |
| 4,056,757 | 11/1977 | Mauch et al. | 307/64 |
| 4,075,476 | 2/1978 | Pitel | 315/209 |
| 4,127,795 | 11/1978 | Kroll | 315/210 |
| 4,207,497 | 6/1980 | Capewell et al. | 315/97 X |
| 4,207,498 | 6/1980 | Spira et al. | 315/97 |
| 4,210,846 | 7/1980 | Capewell et al. | 315/121 |
| 4,251,752 | 2/1981 | Stolz | 315/206 |
| 4,277,728 | 7/1981 | Stevens | 315/307 |
| 4,349,863 | 9/1982 | Petersen | 315/86 |

FOREIGN PATENT DOCUMENTS

| | | | |
|---|---|---|---|
| 2260218 | 8/1975 | France | 363/3 |
| 2052896 | 1/1981 | United Kingdom . | |

OTHER PUBLICATIONS

J. H. Campbell & B. D. Bedford, Fluorescent Lamp Operation at Frequencies above 60 Cycles, 1947, Proceedings of Natn'l Electronics Conf., vol. 3, pp. 480–493.

John H. Campbell, High Frequency Operation of Fluorescent Lamps, Illuminating Engineering, vol. 43, No. 2, Feb. 1948, pp. 125–140.

John H. Campbell, Special Circuits for Fluorescent Lamps, Apr. 1950, Illuminating Engineering, vol. 45, No. 4, pp. 235–241.

John H. Campbell, Characteristics & Applications of High Frequency Fluorescent Lighting, Feb. 1953, Illuminating Engineering, vol. 48, No. 2, pp. 95–103.

John H. Campbell, Elements of High Frequency Fluorescent Lighting, Jul. 1957, Illuminating Engineering, vol. 52, No. 7, pp. 337–342.

John H. Campbell, New Parameters for High Frequency Lighting Systems, May 1960, Illuminating Engineering, vol. 55, No. 5, pp. 247–256.

John H. Campbell, Characteristics of a New 3000–CPS System for Industrial and Commercial Lighting, Mar. 1965, Illuminating Engineering, vol. 60, No. 3, pp. 148–156.
Funke and Oranje, Gas Discharge Lamps, 1951, Phillips' Gloeilampenfabrieken.
Zwikker, Fluorescent Lighting, 1952, Philips Technical Library, pp. 73–143.
D. E. Spencer, Frequency and Fluorescent Lamps, 1953, Electrical Engineering, vol. 72, No. 12, pp. 1066–1071.
Shelly Krasnow, Converter Equipment, 1957, Illuminating Engineering, vol. 52, No. 7, pp. 353–356.
George Gilleard, Fluorescent Lighting Systems from Gas–Driven Turbines, 1964, Illuminating Engineering, vol. 58, No. 3, pp. 163–169.
John H. Campbell, from a paper presented to the National Technical Conf. of the Illuminating Engineering Society in San Francisco, CA, 1959, pp. 560–562.
J. J. Ebers & J. L. Moll, Large–Signal Behavior of Junction Transistors, 1954, Proceedings of the Institute of Radio Engineers, vol. 42, pp. 1754–1772.
John L. Moll, Large–Signal Transient Response of Junction Transistors, 1954, Proceedings of the Institute of Radio Engineers, vol. 42, pp. 1773–1784.
George C. Uchrin & Wilfred O. Taylor, a New Self—Excited Square Wave Transistor Power Oscillator, 1955, Proceedings, Institute of Radio Engineers, vol. 43.
R. L. Bright, Junction Transistors used as Switches, 1955, AIEE Transactions, vol. 74, pp. 111–121.
G. H. Royer, a Switching Transistor DC to AC Converter Having an Output Frequency Proportional to the DC Input Voltage, 1955, AIEE Transactions, vol. 73, pp. 322–326.
C. J. Yarrow, Transistor Converters for the Generation of High–Voltage Low–Current DC Supplies, 1959, Proceedings, Institution of Electrical Engineers, vol. 106, pp. 1320–1324.
W. H. Johnson, J. L. Winpisinger & J. F. Roesel, Jr., a New High Frequency Power Source for Fluorescent Lighting, 1959, Illuminating Engineering, vol. 54, pp. 43–50.
W. H. Johnson, Progress in Static Converters for High Frequency Fluorescent Lighting, 1961, Illuminating Engineering, vol. 56, pp. 379–383.
Robert J. Haver, the Verdict is in: Solid State Fluorescent Ballasts are Here, 1976, Electronic Design News, pp. 65–68.
Charles Cohen, Transistor Ballast Cuts Power Loss, 1979, Electronics.
Chester L. Dawes, a Course in Electrical Engineering, vol. II, 1947, Alternating Currents, 4th Ed., McGraw Hill Book Co., pp. 534–587.

*Primary Examiner*—Howard W. Britton
*Assistant Examiner*—Mark R. Powell
*Attorney, Agent, or Firm*—Workman Nydegger Jensen

[57] ABSTRACT

The invention is both a system for supplying high frequency alternating current to gas discharge lamps, such as fluuorescent lamps, and the like and a unit that can be placed in or adjacent to a lighting fixture to convert a direct current supply into high frequency AC and also provide the ballast needed for operation of the gas discharge lamps. This unit contains a symmetrical, class B, push-pull current-limited, tuned-collector, sinusoidal oscillator which is self starting, highly efficient and stable over a wide range of input voltage, with or without load. The number of parts is a minimum and the parts are relatively low cost, the power losses are very low and the system operates at high power factor with low acoustic and radio noise and low flicker. The system may derive the current from a commercially available source at any voltage and phase but preferably three phase primary of a building transformer can convert this into six phase at the output terminals which can be converted to DC of low ripple even without filtering. From the central building supply, it is possible to send AC at suitable voltage to subcenters in the building for rectification, inversion and use in lighting fixtures but preferably there is a single rectifier adjacent to the main transformer and the DC at proper voltage is distributed to the fixtures where the ballast unit is installed in a fixture to supply the lamps in it with the high frequency AC. However, one ballast unit can serve, in many instances, more lamps than a single fixture holds and it is necessary in such instances to supply the high frequency AC from one fixture to another and this can be done with only two wires. The invention also provides means for dimming the lights, for supplying heating current to lamp filaments at high voltage at the start and much reduced voltage after the arc has been struck in the lamps served by the ballast unit, and this reduction in filament current takes place automatically without switches, resistsors or other expensive and energy consuming means. The transformers used in the practice of the invention may also be used to supply the building with AC for customary appliances, incandescent lighting, and the like.

18 Claims, 5 Drawing Sheets

FIG. 7 (prior art)
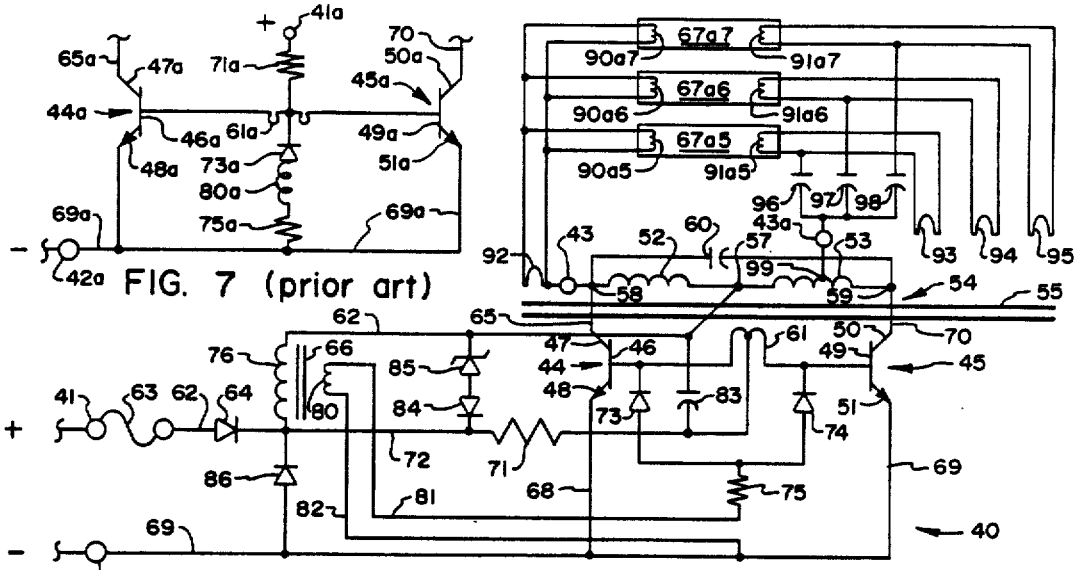
FIG. 6
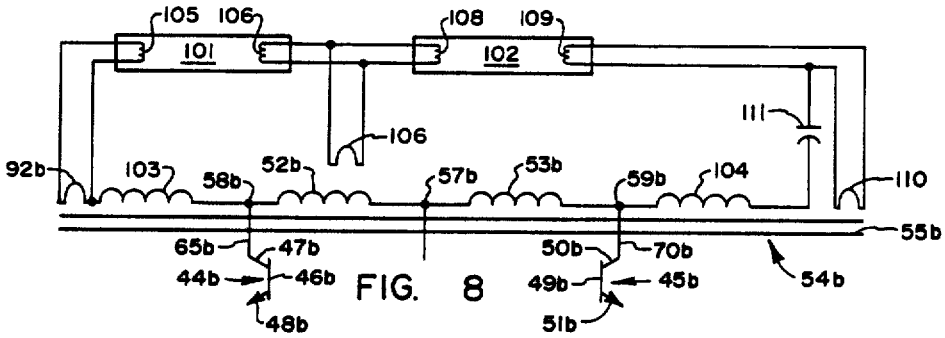
FIG. 8
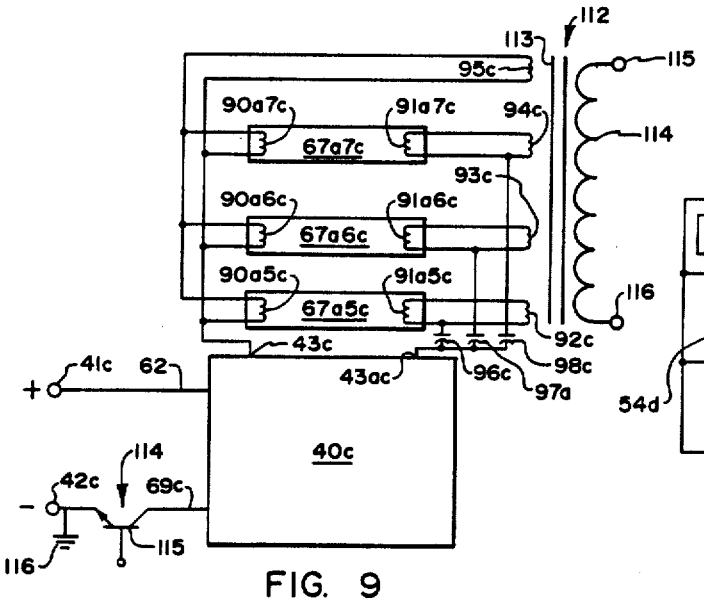
FIG. 9
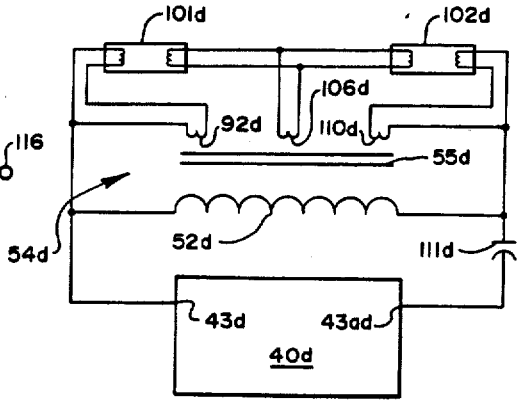
FIG. 10

HIGH FREQUENCY SUPPLY SYSTEM FOR GAS DISCHARGE LAMPS AND ELECTRONIC BALLAST THEREFOR

Matter enclosed in heavy brackets [ ] appears in the original patent but forms no part of this reissue specification; matter printed in italics indicates the additions made by reissue.

INTRODUCTION

This application is a continuation-in-part of our prior application Ser. No. 161,914 filed June 23, 1980, now abandoned.

The present invention relates to an electrical system for supplying high frequency alternating current to gas discharge lamps. The system is adapted to be connected to commercially available alternating current supply lines, preferably a three-phase current supply. The system comprises means to rectify the alternating current to a relatively smooth direct current at a safe voltage for transmission over ordinary building wiring and electronic means to invert the direct current to high frequency alternating current, e.g. 20 to 30 KHZ, and suitable voltage adapted to supply gas discharge lamps, without or with filament heating means, and to control the current through the lamps. The invention also relates to said electronic means referred to herein as electronic or solid state ballast.

BACKGROUND OF THE INVENTION

It is well known to utilize high frequency (20 kHz or above) in the operation of fluorescent lamps for the purpose of eliminating standard 60 cycle noise and reducing power loss via lengthy transmissions within a relatively large building complex.

In the most common prior practice, 60 Hz single phase power has been distributed to be rectified at each fixture. In a large building this necessitates many rectifiers, and large, usually electrolytic, condensers or capacitors and perhaps large inductors. Inductors used for such purposes are inefficient, costly and noisy while electrolytic capacitors are unreliable, temperature sensitive and have limited lifetimes. Capacitor filters used alone lead to a very low power factor for the system and consequently to large power transmission losses.

Prior proposed systems to obtain the benefit of high frequency operation of the lamps by rectifying AC to provide DC to high frequency inverters and to operate at the necessary high power factor, high efficiency and low noise have either been prohibitively costly or have made unacceptable compromises in performance and reliability. No one has succeeded in providing a system which has found acceptance in the market place, which has been affordable, and has the advantages of the present, safe, economic, reliable, efficient and flexible system and ballast for operating at frequencies in the range of about 20 to 30 kHz or higher.

The present invention satisfies this long felt need.

SUMMARY OF THE INVENTION

The present invention comprises a system for supplying high frequency alternating current, preferably from a source of low frequency alternating current by rectifying means and inverting means, to a large number of gaseous discharge lamps, usually fluorescent lamps, e.g., fixtures for all the lamps in a large building, optionally with means for dimming the lamps, and electronic means frequently referred to herein as electronic or solid state ballast, for use in the system (a) for providing the necessary starting voltage for the lamps when the resistance to current flow is comparatively high, (b) for limiting the current flow in the lamp circuit during lamp operation when the resistance to current flow is comparatively low, and (c) for optionally supplying current to heat the filaments or electrodes in the lamps, preferably at a comparatively high level to start operation of the lamp and at a much lower level during operation.

The system comprises a distribution center in which there is usually a single central transformer adapted to be connected to the commercially available AC power source, preferably three-phase current, with its primary winding designed to accept the power from the supply at the line voltage, which is usually too high for safe distribution in the building, and with its secondary designed to supply the building distribution center with current at suitable building voltage. If the available current supply is at suitable voltage for distribution through the building, then a central transformer is not necessary. The building distribution system comprises a plurality of subcenters, e.g., one for each floor, if not too extensive an area, or several if the floor area is too extensive for a single subcenter to suffice for efficient distribution. From the subcenter the usual building needs may be supplied by means of a transformer having its primary designed for the voltage of distribution from the center and its secondary designed for connection to convenience outlets and the like (not shown) which usually are supplied by 110–130 volt lines. At the subcenter a rectifier is provided at strategic locations on the floor to convert the AC to DC to supply a plurality of inverters near the lamps. Preferably the transformer in the subcenter has its primary windings connected in delta configuration and its secondary windings connected in star or Y-configuration with the common connection serving as a terminal for a neutral or ground line. Preferably the secondary windings include not only the usual three windings but an additional three windings wound in the manner described hereinafter so as to supply six-phase current to the rectifiers. Six-phase current has a relatively small ripple which makes rectification to an almost smooth direct current relatively simple and inexpensive. The rectifier preferably comprises a six-phase diode bridge providing direct current as a positive and at a negative terminal for connection to positive and negative lines, which, with the natural or ground line mentioned above form a DC distribution system for supplying the inverters. There is an inverter for each fixture or group of adjacent fixtures, depending upon the number of lamps per fixture. The inverters of the invention are capable of supplying one to four or even a few more lamps without overloading. One skilled in the art can readily determine the number of lamps and fixtures to be supplied by each inverter from the ratings of the lamps and inverters.

The inverter includes means to convert the direct current it receives from the system described above into high frequency alternating current, e.g., 20 to 30 kHz, a transformer for this high frequency AC to convert the voltage generated in the conversion means into proper voltage to operate the lamps, and, if desired, to heat the filaments thereof. Means to smooth out the DC before it is converted to AC may be incorporated, if deemed necessary or desirable. Further, means to facilitate starting the lamps may be provided as well as means to limit the current flow through the lamps after they begin to conduct current. The inverter and associated means constitute the electronic or solid state ballast of the invention.

BRIEF DESCRIPTION OF THE SEVERAL VIEWS OF THE DRAWING

The invention, its features and advantages, will be described in conjunction with the several views of the drawings in which:

FIG. 4 represents an additional secondary for the transformer in the central power room or the transformer in the inverter to obtain single-phase AC for use in convenience outlets, for driving motors of air-conditioning equipment and the like;

FIG. 6 is a circuit diagram of an inverter circuit suitable for use in the system of FIG. 1;

FIG. 7 shows a circuit diagram of a portion of a transistorized inverter of the prior art;

FIG. 8 is a modification of a portion of the circuit of FIG. 6 showing how to operate multiple rapid start fluorescent lamps in series;

FIG. 9 is a circuit diagram of a portion of the circuit of FIG. 6 modified to provide for flashing of fluorescent lamps;

FIG. 10 illustrates a further modification of a portion of the circuit of FIG. 6 to provide means to reduce the power supplied to the electrodes of the lamps after starting;

DETAILED DESCRIPTION OF THE INVENTION

As stated in the summary of the invention above, the present invention comprises a system for supplying high-frequency alternating current to a plurality of fixtures for gaseous discharge lamps, usually fluorescent lamps. The preferred system will now be described which is adapted to receive low-frequency (50 to 60 Hz) alternating current from a commercially available source at whatever voltage the source happens to provide, transform it, if necessary, to a voltage suitable for distribution and transmitting it to rectifying means which produces a three-wire direct current circuit which supplies power to the inverting means for converting the DC into high-frequency, high-voltage alternating current. Each inverter supplies the high-frequency (20 to 30 kHz or higher) current to at least one fixture adapted to hold at least one fluorescent lamp. The fixture wiring connects the filaments or electrodes of the lamps to the high-frequency, high-voltage lines from the inverter. The invention is not limited to this preferred embodiment, however, but contemplates a system which derives the current for operating lamps in the fixtures of the circuit of the invention from a DC source instead of, or as an emergency adjunct to, the AC source mentioned above, as will be described in greater particularity hereinafter.

THE PREFERRED SYSTEM

Figure 1:
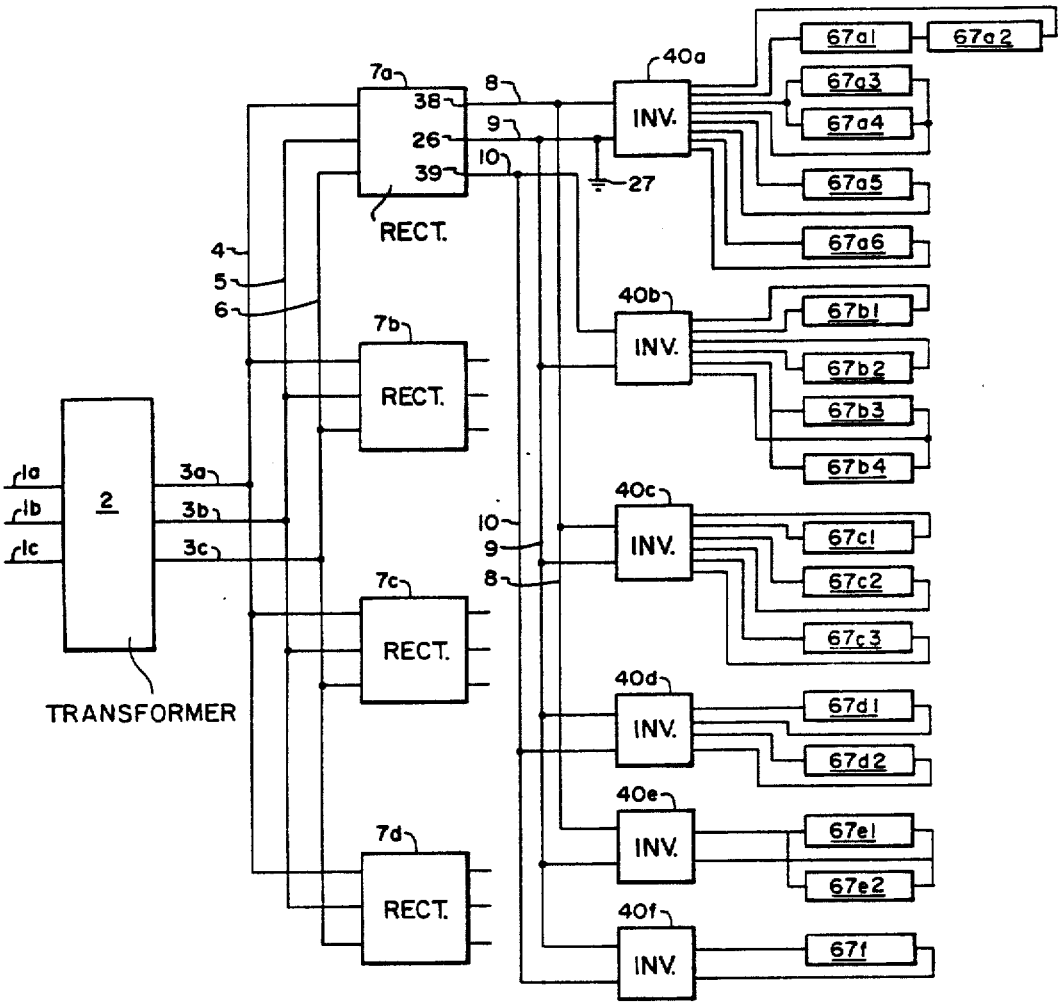
FIG. 1 is a block diagram of the system of the invention showing the commercial power source of three-phase current, a transformer for reducing the high supply voltage to a voltage suitable for distribution from the central transformer for the building to subcenters where the AC is rectified to DC, preferably a three wire transmission system, to supply a plurality of inverters which supply the desired high frequency power to operate the lamps.

Referring first to FIG. 1, the system obtains its power from a commercially available source (not shown) to which connection is made by terminals 1a, 1b and 1c of the primary of a transformer 2. In most countries of the world commercially sold power is generated and transmitted as low-frequency (50 to 60 Hz) alternating current and, in order to minimize $I^2r$ losses in transmission, it is stepped up by transformers to a much higher voltage than the output of the generator and then stepped down, usually in a succession of voltage reductions, to voltages deemed safe for the various parts of the transmission system from the main transmission line to the entrance to the customer's premises. Sometimes this supply voltage is in the 110 to 240 volt range, which is considered a safe voltage for distribution in a building occupied by humans, such as a home, barn, shop, store, Church, place of entertainment, etc. In many cases, particularly in recent years, the power is brought to the customer's premises at a much higher voltage, especially where the building to be supplied is a Church, a school, a commercial structure, of the like. It is usual practice in such cases to provide in the building a central transformer room to house the transformer necessary to reduce the supplied voltage to a voltage suitable for the building through which it will be distributed. Transformer 2 represents such a central transformer and its primary winding would be insulated to operate safely at the high supply voltage. The secondary winding would have the right number of turns in relation to the number of turns in the primary winding to step the voltage down to the building distribution voltage and make it available for connection to the building distribution system by output leads or terminals 3a, 3b and 3c. The primary windings for a three-phase circuit may be connected delta or Y, as may the windings of the secondary also be connected.

The building distribution system shown is a three-wire circuit from the transformer 2 and it is represented by lines 4, 5 and 6 which are connected to the terminals 3a, 3b and 3c.

The lines 4, 5 and 6 are connected to a plurality of rectifying means 7 at subcenters in the distribution system. For such rectifying means are illustrated in FIG. 1 by way of example and they are designated as 7a, 7b, 7c and 7d for ease of reference in FIG. 1 but the general designation 7 is used in the illustration thereof in FIGS. 2 and 3 and the following description thereof. In general each floor of a large building would have at least one subcenter and if the floor area is larger than a single subcenter can efficiently supply, a floor might have two or more subcenters.

If commercial power is available at the premises of a building at suitable building voltage, transformer 2 would not be necessary and the building distribution system would then start with lines 4, 5 and 6 which would connect directly to the source of power but there still would be a need for a building center to receive the power and distribute it to the lines going to the subcenters.

Each rectifying means 7 receives the low-frequency alternating current at the building voltage on its input side and delivers the power from its output side as three-wire direct current to lines 8, 9 and 10.

Figure 2:
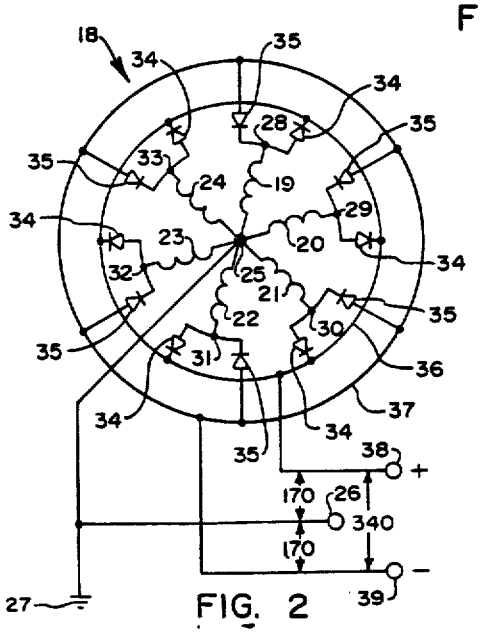
FIG. 2 is a schematic diagram of the secondary of the transformer in the rectifier with associated parts to provide three-wire direct current for the inverters.
Figure 3:
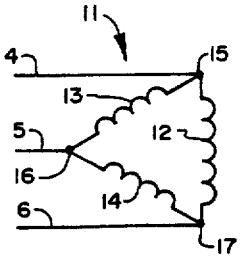
FIG. 3 represents the primary of the transformer of FIG. 2.

Referring now to FIGS. 2 and 3, each rectifying means 7 comprises a transformer having an iron core (not shown) and primary and secondary windings. The primary 11 (FIG. 3) has three windings 12, 13 and 14 in delta connection providing terminals 15, 16 and 17 to which lines 4, 5 and 6 are connected as shown.

The secondary, 18 (FIG. 2) of the rectifier transformer comprises six windings 19, 20, 21, 22, 23 and 24 having a common central connection 25 forming one terminal 26 on the output side of the rectifying means 7. Terminal 26 may be grounded, as illustrated at 27, and it is sometimes referred to herein as the common, neutral or grounded terminal. Line 9, which FIG. 1 shows to be connected to terminal 26 of rectifying means 7a, is also sometimes referred to herein as the neutral, common or grounded line.

The current delivered by the rectifying means 7a to lines 8, 9 and 10 and the voltages across these lines are relatively smooth. When the EMF of each winding is plotted against time, the envelope of the successive positive peaks has a maximum variation of 13.3%, i.e., taking the peak or maximum EMF across center connection 25 and the end terminals 28, 29, 30, 31, 32 and 33 of the six windings of the secondary as unity, the minimum EMF is 0.867. By the optional use of a smoothing inductance and/or capacitance in the load line, as hereafter mentioned for the circuits of the invention, the ripples in the load current become still smaller that they may be neglected without serious error.

Each said end terminal 28 through 33 of each secondary winding 19 through 24 is connected to the mid point of a bifurcated line having in one leg an outwardly oriented diode 34 and in the other leg an inwardly oriented diode 35. The cathode of each diode 34 is connected to a common line 36, and the anode of each diode 35 is connected through its leg of the bifurcated line to a different outer end of a secondary winding 19 through 24. Similarly the anodes of each of the six diodes 35 are connected to a common line 37 and the cathodes are each connected through its leg of the bifurcated end to a different outer end of a secondary winding 19 through 24. Common line 36 is connected to terminal 38 and common line 37 to terminal 39 on the output side of the rectifier 7. It is to terminal 38 that line 8 is connected and to terminal 39 that line 10 is connected, as shown in FIGS. 1 and 2. The voltage between terminals 26 and 38 is the same, except for polarity, as the voltage between terminals 26 and 39 and the voltage between terminals 29 and 38 is double that, as shown in FIG. 2. What these voltages are is a matter of design of the secondary windings with respect to the primary windings. In practice it is satisfactory if the peak voltage across a secondary winding is 170 volts, therefore, the DC voltage across terminals 26 and 38 and across terminals 26 and 39 will also be approximately 170 volts; the voltage across terminals 38 and 38 is double that or 340 volts.

Figure 4:
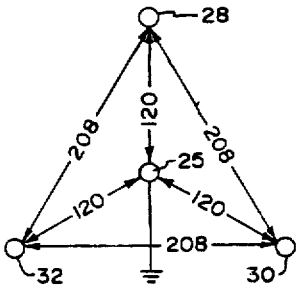
Figure 5:
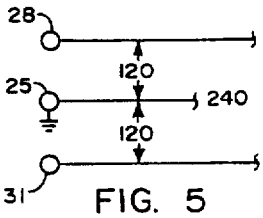
FIG. 5 is a similar diagram to FIG. 4 showing means [to obtain single-phase] current at 120/[208] *240* volts, [single or three-phase]

The rectifier transformer may also be used to supply AC power to energize AC loads such as convenience outlets and AC motors. It is popular practice at present to distribute power to large buildings at 277/480 volts, three-phase AC and to energize the lighting systems directly from this source. The convenience outlets and other loads require 120 (110 to 130) volts and it is present practice to use numerous dry-type transformers throughout the building to convert 480 volt, three-phase current to 120/208 volts. The transformer used in the rectifier shown in FIG. 2 will supply 120 volt single phase current to a load, if the load is connected either to terminal 28, 30 or 32 and to neutral point 25, as shown schematically in FIG. 4, or to terminals 29, 31 and 33 and neutral point 25, or three phase current to a load if the load is connected to terminals 28, 30 and 32, or single phase 208 volt current to a load if the load is connected to terminals 28 and 30, or 28 and 32, or 30 and 32. Furthermore, single-phase outputs of 120/240 volts can be obtained from terminals 28 and 31 and neutral point 25, in a three-wire system, as shown schematically in FIG. 5, or equally well from terminals 29 and 32, or 30 and 33 and neutral point 25. The output terminals for the circuits of FIGS. 4 and 5 will be located in the output side of the rectifier 10 (although they are not rectified and not shown in FIG. 1) and have been given the designations 28, 30 and 32, and 28, 25 and 31, respectively for convenience of reference. The rectifier of FIG. 2 incorporates a three-phase transformer such as is utilized in modern building power distribution systems to furnish power for 120, 208, or 240 volt AC loads. By making combined use of the same transformer in the DC power supply system of the invention, lower cost of the total system is achieved than in prior art high-frequency lighting systems.

If desired, DC output voltages other than plus and minus 170 volts can be obtained from the rectifier of FIG. 2. Thus, lower voltages may be obtained merely by connecting the twelve diodes 34 and 35 to taps (not shown) on secondary windings 19 to 24, inclusive, and higher voltages may be obtained by providing extensions (not shown) to the said windings. DC outputs of plus and minus 120 volts are especially desirable because of previously established standards of potential use in appliances other than the present lighting system.

The three-wire DC distribution system has the advantage over a two-wire DC system that smaller wires may be used, the secondary windings 19 through 24 are more fully utilized, with each conducting twice each cycle, no direct current flows in any of these windings nor in the neutral line 25 if the DC loads are equal on the positive and negative lines 36 and 37, and the positive DC power supply may continue to operate in the event of failure of the negative supply, and vice versa.

In the operation of the illustrated rectifier each of the six secondary windings 19 through 24 produces a sinusoidal alternating voltage varying over a cycle from minus 170 to plus 170 volts. Because of the three-phase excitation of the primary 11 of the transformer, the voltages of the outer terminals 28 through 33 of the six secondary windings will reach their positive peaks at different successive times equally spaced within a cycle of the low-frequency current. At any instant, one of the terminals 28, 29, 30, 31, 32 or 33 will be more positive than all of the other terminals in this group and approximately 170 volts more positive than the neutral point 25. The diode 34 connected to the more positive terminal connects it to conductor 36. The remaining five diodes are in non-conducting states at this instant. As time progresses, each of he other five diodes 34 conducts in turn, one at a time, to connect the most positive winding to conductor 36. Thus, conductor 36 remains at all times approximately 170 volts more positive than the neutral point 25 and the AC transformer voltages have been rectified to DC voltage. The six diodes 35 operate in a similar manner one by one to connect the most negative terminal from the group 28 through 33 to conductor 37 which remains approximately 170 volts more negative than neutral point 25. The rectifier of FIG. 2 produces a good, low-ripple DC output of about 4.5% ripple while preserving a high power factor of about 95.5% in the three-phase supply circuit 4, 5, 6.

The three-wire DC lines 8, 9 and 10 supplied from terminals 38, 26 and 39, respectively, of rectifying means 7a are connected to a plurality of balanced loads cross lines 8 and 9 for one load circuit and across lines 9 and 10 for another load circuit. Each load is an inverting means 40 connected to fluorescent lamps 67 in various numbers and arrangements. Six such inverting means are shown by way of example in FIG. 1. They are given letter designations a through f for ease of reference but in the following description of the inverting means illustrated in FIG. 6 the general designation 40 is used and the description of the circuit of FIG. 6 applies to each inverting means 40a through 40f. Inverting means 40a, 40c and 40e are in parallel across lines 8 and 9 while 40b, 40d and 40f are in parallel across lines 9 and 10. While a total of six inverting means is given by way of example, the invention contemplates any desired number thereof in the output circuit of a single rectifying means 7 from one to as many as the rating of the rectifying means permits. Any person skilled in this art can readily determine the maximum number of inverting means which the rating of the rectifying means 7b, 7c and 7d also has a load circuit similar to the load circuit described and illustrated for rectifying means 7a.

The fluorescent lamps 67 in FIG. 1 have been given postscripts identifying them with the particular inverting means 40a, 40b, 40c, 40d, 40e and 40f which supplies them with high-frequency alternating current. Thus, the lamps supplied from inverter 40a are designated 67a1 and 67a2 which are in series, 67a3 and 67a4 which are in parallel, 67a5 and 67a6, each being supplied individually. Similarly the lamps supplied from inverter 40b are designated 67b1 and 67b2, each supplied individually, and 67b3 and 67b4 in parallel. Likewise lamps supplied from inverter 40c are designated 67c1, 67c2 and 67c3, all supplied individually; lamps supplied from inverter 40d are designated 67d1 and 67d2, each supplied individually; lamps supplied from inverter 40e are designated 67e1 and 67e2 and are arranged in parallel; and the lamp supplied from inverter 40f is designate 67f.

THE INVERTING MEANS

Referring now to FIG. 6, the inverting means 40 comprises a positive input terminal 41 and a negative input terminal 42. These terminals, 41 and 42, are adapted to be connected to the direct current lines from the rectifying means 7, e.g., across lines 8 and 9 or across lines 9 and 10. In the event a source of direct current other than the rectifying means 7 is used, which the invention contemplates as mentioned above, terminals 41 and 42 would be connected to whatever source is to be used, e.g., battery circuit for emergency use or use remote from a commercial source of power, a solar cell, a fuel cell, or the like. On the output side of the inverting means 40 are two terminals 43 and 43a for the high-frequency current generated in the inverting means 40 by the means now to be described in detail. The entire circuit from input terminals 41 and 42 to the output terminals 43 and 43a comprises each inverting means 40a, 40b, 40c and 40d.

The inverter means 40 further comprises two transistors 44 and 45 which are the active elements of a high-power, push-pull, class-B, tuned-collector, current-driven oscillator. An oscillator of this sort, intended to produce a large amount of AC power from a DC source, is commonly denominated in this art as an inverter and that name is generally used herein for such elements of the circuit of the invention. Transistor 44 has a base 46, a collector 47 and an emitter 48. Transistor 45 has a base 49, a collector 50 and an emitter 51. The tuned circuit comprises inductors or windings 52 and 53 of an inverter transformer 54 which has a magnetic core 55, e.g., a ferrite core. Windings 52 and 53 have a common center terminal 57 and end terminals 58 and 59. A capacitor 60 is connected to the end terminals 58 and 59 which in turn are connected to collectors 47 and 50 by lines 65 and 70, respectively. This circuit is tuned to oscillate or resonate at a frequency of at least 20 kHz in order (1) to enhance the efficiency of fluorescent lamps, (2) to be inaudible and (3) to make possible the utilization of small and practically loss-free circuit components. Collector inductors 52 and 53 are wound on the magnetic core 55 of transformer 54, along with other windings which are described hereafter. In operation, a high AC voltage of sinusoidal waveform appears across the end terminals 58 and 59 of inductors 52 and 53. A feedback winding 61 is provided on core 55 and by transformer action a much smaller voltage is induced in it than in windings 52 and 53 because of the small number of turns it has. The end terminals of feedback winding 61 are connected respectively to bases 46 and 49 of the transistors 44 and 45. The polarity of the feedback voltage is selected to provide positive feedback from collectors to bases as required to maintain or sustain oscillation. The transistors operate in an efficient alternate switching mode, one being turned off completely at one instant while the other is saturated at which time it is turned fully on and is equivalent to a closed switch. The feedback signal to the bases causes switching from one state to the other. The transistor with the more positive base voltage is saturated or in the "on" state. The transistor with the more negative base voltage is in the "off" state. A brief transitional interval is required to complete switching from one state to the other.

Direct current flowing into the inverting means 40 from the rectifying means 7, or other power source as described above, enters at the positive terminal 41 which is connected by conductor 62 to the center terminal 57 of windings 52 and 53 through a fuse 63, a diode 64 and an inductor or winding 76 on a magnetic core 66. At the central terminal junction point 57 the current must take one of two alternate paths. One path comprises inductor or winding 52, terminal 58, line 68, collector 47, emitter 48 of transistor 44, line 68 and line 69 which returns current to the rectifying means 7 or other source through terminal 42. The current takes this path when transistor 44 is in conducting mode. The other path which the current takes, when transistor 44 turns off and transistor 45 turns on, comprises winding 53, terminal 59, line 70, collector 50, emitter 51 of transistor 45, line 69 and terminal 42, thus returning the current to the rectifying means 7 or other source along this second path. Current flowing alternately through windings 52 and 53 of transformer 54 produces an alternating voltage in every winding on the core 55, which is the desired result of the action of inverting means 40.

Transistors can generally turn on more quickly than they can turn off. Consequently, one transistor will turn on before the other transistor has turned completely off. This results in an actual short circuit across the terminals 58 and 59 of the windings 52 and 53 for a brief interval at each switching time. This short circuit is rendered harmless because inductor 76 maintains an essentially constant current through itself and associated parts of the circuit and thus prevents the transistor collector currents from rising appreciably during the short circuit or conduction overlap period. The transistors thus start and complete their switching actions under ideal conditions of practically zero collector voltage and externally limited collector current.

Resistor 71 in line 72, which connects conductor 62, e.g., at the junction of adjacent terminals of diode 64 and inductor 80, with the midpoint of feedback winding 61 conducts a small current from the positive DC input terminal 41 and conductor 62 to the bases 46 and 49, respectively, of the two transistors 44 and 45 by way of feedback winding 61. This is the only source of base current when the inverter is first turned on and is essential for reliable starting. As oscillations build up, most of the base current comes from voltage induced in the feedback winding 61, as will be described in more detail hereafter.

Diode 64 is optional and, when used, prevents the blowing of fuse 63 if the input terminals 41, 42 are connected to the DC supply lines 8,9 or 9,10 of wrong polarity.

Diode 73 connects the base 46 of transistor 44, and diode 74 connects the base 49 of transistor 45, the line 69 through resistor 75.

The difference in the operation of the circuit of the invention over the typical prior art base connection arrangement may be clearly understood by comparing FIG. 7 with FIG. 6. In FIG. 7 comparable parts have the same reference numbers used in FIG. 6 with a postscript a.

The typical prior art base connection arrangement comprises two transistors 44a and 45a, a single diode 73a connected in series with inductor 80a and resistor 75a, and this combination connects the center tap of feedback winding 61a to the emitters 48a and 51a of both transistors 44a and 45a. The purpose of this circuit is efficiently to provide a large DC component of base current by rectifying the low voltage of the feedback winding 61a. The base-emitter junctions of the transistors provide the rectifying action, and the inductor 80a maintains base current in at least one transistor during the switching instants when the alternating feedback voltage passes through zero. Diode 73a merely prevents the draining away of the small starting component of base current from resistor 71a. Neither base can rise more than about 0.8 volt above the emitters because of the transistor characteristics. This requires that most of the feedback voltage across winding 61a will show up as negative voltage at the base of the "off" transistor, whichever that may be at any given time. Also, the center tap of winding 61a will be driven negative twice each cycle at the one time each cycle when each base goes negative. As the center tap goes negative, current flows upward through diode 73a, inductor 80a and resistor 75a and continues into the base of whichever transistor is turned on. This current is largely responsible for turning the transistors on. As stated previously, the inductor 80a keeps the current through itself substantially constant, providing a steady source of current for one or the other of the bases.

With this prior art circuit, the maximum voltage across the feedback winding 61a is necessarily only a few volts, as limited by the peak reverse voltage rating of the emitter-base junctions of the transistors. A significant portion of this voltage is lost in diode 73a and in the emitter-base junctions of the transistors. Thus, when feedback voltage is reduced because of low-line voltage, as may be experienced during a "brown-out" and at other times, the base drive voltage becomes unreliably small, and a condition of intermittent oscillation known as "squegging" can occur. In particular, the transistors may not saturate but conduct current while a large voltage exists from collector to emitter, increasing power dissipation which may quickly damage the transistors.

With the present invention, as shown in FIG. 6, two diodes 73 and 74 are connected one at each end of the feedback winding 61, rather than having a single diode at the center tap as shown in the prior art circuit in FIG. 7. This doubles the voltage available for rectification and allows stable operation down to such low input line voltages that the transistors are adequately protected for all low voltage conditions.

Inductor 80 is not always required in FIG. 6. However, when used, it can reduce peak base current and reduce the power dissipated in resistor 75a (FIG. 7) or resistor 75 (FIG. 6). A more economical way to implement the equivalent inductor 80a in FIG. 7, if such is desired, is to substitute for inductor 80a a few turns of wire 80 around the core 66 of inductor 76, as shown in FIG. 7, connected in series with resistor 75. This causes current to flow from diodes 73 and 74 through resistor 75, line 81, winding 80 and line 82 to line 69 in the circuit of FIG. 6. Transformer action from the main inductor winding 76 then induces the same voltage in these few turns 80 that inductor 80a would ideally have, but without the expense of an additional magnetic core and bobbin. Winding 80 adds an AC voltage at the bottom of resistor 75 equal to the AC component of voltage from feedback winding 61 at the top of [resister] *resistor* 75, leaving only a DC voltage across resistor 75, resulting in the same constant base current provided in prior art by the additional inductor 80a.

A small capacitor 83 is preferably connected between the junction of collector windings 52 and 53 and the feedback winding 61. This capacitor helps speed the switching action by drawing base current away from the base of whichever transistor is turning off at the proper time and by adding base current to the turning-on transistor a moment later.

Diode 84 and Zener diode 85, when used, are arranged in series with each other and across inductor 76, as shown, to limit the maximum positive voltage that can be applied to the transistor circuit. A dangerous voltage capable of destroying the transistors can otherwise occur during the transient condition when the inverter is first switched on to the low-impedance voltage source from the central rectifier 7.

A diode 86 may be placed across the DC input lines. This diode conducts only for an instant when the DC input power is switched off. It provides a controlled path for decay of the current stored in inductor 76 when that current can no longer flow through the input line 62. Diode 86 also reduces arcing at the switch (not shown) which turns off the DC input voltage. Diodes 84 and 86, Zener diode 85 and capacitor 83 comprise transient suppression circuitry.

In the preferred embodiment shown, the several windings are placed on transformer core 55. This avoids the use of two more costly individual transformers, as are commonly used in the prior art.

The AC output of the inverter can be used in many ways. FIG. 6 illustrates how three, or more, "rapid start" fluorescent lamps 67a5, 67a6 and 67a7 can be driven. These lamps have electrodes in the form of filaments at each end thereof, which must be heated by a flow of current produced by means of a low voltage. For ease of description, the filaments in lamp 67a5 are designated 90a5 and 91a5, those in lamp 67a6 are designated 90a6 and 91a6, and those in lamp 67a7 are designated 90a7 and 91a7, respectively. The heater voltage for the filaments 90a5, 90a6 and 90a7 is obtained from low voltage heater windings 92 on magnetic core 55. Filaments 91a5, 91a6 and 91a7 at the opposite end of each lamp require separate heater windings 93, 94 and 95 on the same core, as shown. Fluorescent and other gas discharge lamps have a negative impedance characteristic which makes direct parallel operation impractical. Each lamp requires a ballast impedance in series with it to limit the current. Either inductors or capacitors can perform the ballast function without wasting energy. Capacitors 96, 97 and 98 are shown as ballasts in FIG. 6. Windings 52 and 53 constitute a sinusoidal high voltage, high-frequency power supply for the lamps. The voltage of these windings is determined almost completely by the DC input voltage to the inverter, but the voltage applied to the lamps can be selected independently by tapping one or both of the windings 52 and 53 as shown at tap 99 for lower voltage. A higher voltage can be obtained by extending either or both windings with additional turns (not shown) beyond the points where the transistor collectors connect.

An entirely separate winding (not shown) on core 55, of any desired voltage, can be used for the lamps and with full transformer isolation, if necessary or desirable.

Other loading arrangements are possible and more (or fewer) than three lamps can be accommodated by the system of FIG. 6 as shown in FIG. 1 and described above. This parallel system of operation permits removal of part of the lamps from the fixture to adjust light intensity without appreciable effect on the remaining lamps. Lamps can also be operated in series or series-parallel, particularly if there are an even number of lamps. Such an arrangement reduces the number of ballast capacitors needed and makes dimming by adjusting ballast capacitance entirely feasible.

Many fluorescent and other gas discharge lamps do not require separately heated filaments, and if such lamps are used, the heater windings 92, 93, 94 and 95 would not be needed.

FIG. 8 shows that portion of the circuit of FIG. 6 that may be modified for series operation of two rapid start lamps 101 and 102. Parts in the circuit of FIG. 8 that correspond to parts in the circuit of FIG. 6, are given the same reference number with the postscript b and need not be further discussed at this point. Voltage greater than that between the transistor collectors is obtained by adding one or two extension windings 103 and 104 to the core 55b. Windings 92b, 106, and 110 then provide heating power for the lamp filaments, 105, 107, 108 and 109. A single capacitor 111 provides current limiting or ballasting for both lamps.

DIMMING

Rapid start fluorescent lamps are readily dimmed by lowering the capacitance of the ballast capacitor 111 in FIG. 8. One simple means is to make capacitor 111 from a number of separate capacitors which can be switched manually or remotely into the circuit in various combinations [be] *by* conventional switch means (not shown). Another means adaptable to adjustable zone lighting is to plug in different values of capacitor 111 in accordance with a desired lighting level. Dimming by adjustment of the ballast capacitor allows for full starting voltage at all levels and is superior therefore to voltage reduction methods. The preferred dimming method described keeps filament voltages constant, as is usually desired when dimming.

Dimming is also readily achieved by the circuit illustrated in FIG. 19 as fully described hereinafter.

FLASHING

The inverter 40 is readily adapted to utilize electronic control for flashing. This requires only a modification of a portion of the circuit of FIG. 6. Such a modified portion of the circuit shown in FIG. 9 in which parts comparable to parts in FIG. 6 have been given the same reference numbers with a postscript c and need no further description here. A separate transformer 112 having a magnetic core 113, a primary winding 114 with terminals 115 and 116 adapted to connect the primary to an AC source of any frequency, and a series of secondary coils 92c, 93c, 94c and 95c for heating the filaments of lamps 67a5c, 67a6c and 67a7c, operating independently of the inverter keeps the filaments always heated, so that filament windings from the inverter itself are not needed. DC power into the inverter is controlled by transistor 114 which can be turned on and off by a low-level signal (less than 1 volt) between the base 115 and ground 116. This method of switching is superior to and easier to accomplish switching in an AC circuit. A mechanical switch could replace transistor 114 if desired.

FILAMENT CONTROL

FIG. 10 shows a modified form of the circuit of FIG. 8 in which comparable parts have been given the same reference numbers with a postscript d. The filaments of lamps 101d and 102d are supplied from a transformer [54b] *54d* instead of directly from the constant-voltage inverter transformer 54 of FIGS. 6 and 8. The primary 52d of transformer 54d receives its input from the lamp voltage. Before the arc strikes in the lamps, there is little voltage drop in the ballast capacitor 111d and practically the full inverter voltage is applied to the primary of the transformer 54d. This results in a relatively high output of transformer 54d to heat the filaments rapidly. As soon as the arc strikes, the lamp arc voltage drops substantially, lowering the voltage on all windings of transformer 54d and specifically reducing the heater voltages on windings 92d, 106d and 110d. Reduced heater voltage means that less power is consumed and the circuit operates more efficiently than it would otherwise do. No switches are needed to accomplish heater power reduction, in contrast to the practice in some prior art systems. Placing the heater windings on transformer 54d simplifies the design of already complicated transformer 54. Because of the high frequency used, transformer 54d can be very small, inexpensive, and free from power loss. Note that the heaters are not shut off entirely since this would be harmful to the life of some filaments. The greatest damage to filaments normally occurs during starting when they are bombarded by heavy ions before the reach proper operating temperature. The control offered by transformer 54d shortens this time of bombardment and assures increased lamp life as well as improved operating energy efficiency.

Figures 11A, 11B, 11C:
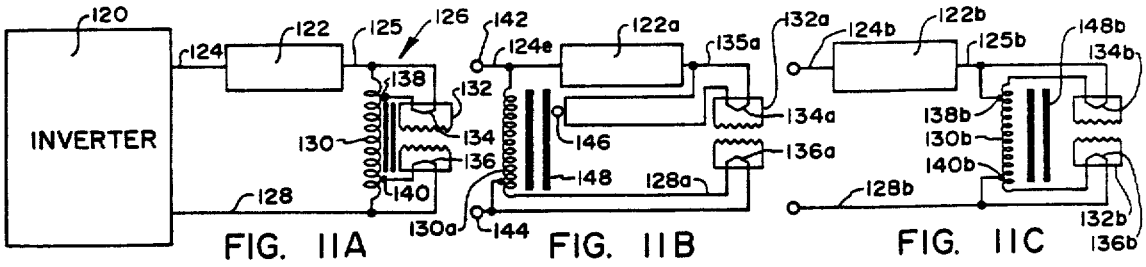
FIG. 11A is a diagram of a circuit which supplies filament heating current to both filaments or electrodes of a fluorescent lamp at two levels, (1) full heating current at the start of operation of the lamp and (2) greatly reduced filament current, e.g., about one-third of the normal filament power, during operation of the lamps.
FIG. 11B is a diagram of the right portion of FIG. 11A modified to supply constant heating power to the filaments of the lamp.
FIG. 11C is a further modification of the right portion of FIG. 11A to achieve the same result but with slightly different connections to the transformer.

FIG. 11A depicts a circuit which is capable of supplying a high current to the filaments of a heated filament fluorescent lamp when the lamp is first turned on at the start of a lighting cycle and automatically reducing the current flow through the filaments as soon as stable operation is achieved. The circuit comprises an inverter illustrated by the block 120, which may have the same circuit described above or it may have any other circuit which will accomplish the same function, a ballast represented by the block 122, which may be any electronic component serving this function such as an inductor or capacitor, an electric connection 124 between the inverter and the ballast, a line 125 from the ballast 122 to a load 126 to be described more fully hereunder, and a return connection 128 to the inverter 120. The load illustrated comprises an autotransformer 130 having one terminal connected to line 125 and the other terminal connected to line 128, a fluorescent lamp 132 having a filament 134 at one end and a filament 136 at the other end. The current for filament 134 is supplied from one end of the autotransformer 130 by a tap 138 just a turn or so from that end while the current for filament 136 is supplied from the other end of the autotransformer by a tap 140 just a turn or two from said other end.

After the inverter 120 has been turned on and before the arc has been struck between the cathodes or filaments 134 and 136 of the lamp or tube 132, very little electric current flows through the lamp and ballast circuit. Accordingly there is little voltage drop in the ballast impedance 122, and essentially all the voltage from the inverter 120 appears across the entire winding of the autotransformer 130. Voltages suitable for quickly heating the filaments or cathodes 134 and 136 are induced in the end turns of the autotransformer beyond taps 138 and 140, respectively. After a short period of heating, sufficient electrons are emitted by the cathodes or filaments 134 and 136 to permit an arc to be established between the cathodes. A large electric current then flows through the lamp and ballast, and a large voltage drop occurs in the ballast. The voltage remaining across the lamp terminals (between the filaments or cathodes) drops to a much lower value, e.g., about half its former value, more or less. This lamp voltage is applied to the autotransformer, so the voltage in every part of the autotransformer winding drops to the lower value. In particular, the voltage in the heater turns beyond taps 138 and 140 drops and reduces the cathode heating voltage to the said lower value. The direct heating power for the cathodes depends on the square of the voltage, so the heating power drops to substantially less than half its former value. Typically ⅔ of the energy used for direct cathode heating can be saved by this means. Note that no switches, electronic or otherwise, are needed and that the lamp-ballast filament transformer circuits are connected to the inverter by only two conductors. Thus, the circuit is inexpensive and convenient for use in a lamp fixture separate from the one containing the inverter As such, a system including several one-lamp or two-lamp fixtures can be operated from a common inverter which for economy should be loaded to its full capacity.

Not only does the autotransformer 130 allow energy saving, but it does so without the disadvantage of certain prior-art ballasts which turn the heaters off completely. A definite voltage maintained across the length of each cathode encourages the intercathode arc to form first between the ends of the cathodes where the voltage difference is greatest. A hot spot forms there where most of the electron emission takes place. As the electron-emitting oxide is burned away from one end of each cathode, the hot spot moves to an adjacent spot having the next highest voltage and in this manner progresses in an orderly way along the entire filament throughout the useful life of the lamp. If a definite voltage is not provided across the filament, the hot spot may wander out of control and may never reach some portions of the cathode still having good oxide coatings. Premature cathode failure results.

In summary, one feature of the present invention provides means to maintain sufficient voltage across each cathode to promote orderly hot spot migration while saving ⅔ of the cathode heater power.

One filament transformer similar to 130 but with additional filament windings, some of which are not conductively connected together as in an autotransformer but isolated as in a conventional transformer, can serve two or more lamps connected in series in a straight-forward extension of the circuit described above.

In applications not needing to conserve heater power, the heaters can be energized in this system, as in prior-art, directly from additional windings not shown, on the main inverter transformer or from one or more intermediate transformers with primary windings connected to the inverter output ahead of the ballast impedances.

FIG. 11B illustrates a modification of the circuit of FIG. 11A which provides constant heater power. In this figure, parts which are the same as comparable parts in FIG. 11A have been given the same reference numbers and need not be described again for the circuit of FIG. 11B. The significant difference in the circuit of FIG. 11B over the circuit of FIG. 11A is the filament transformer 130a is connected across lines 124a and 128a between the terminals 12 and 144 from an inverter (not shown), e.g., such as 120, and the ballast 122a. This means that the voltage across the transformer does not change substantially with current flow so that the voltage supplying current to the filament 134a and 136a remains practically constant during operation of the lamps. The high-frequency transformer 130a is preferably a transformer having a magnetic core, e.g. ferrite core, 148.

FIG. 11C depicts a further circuit modified from that of FIG. 11A which also has such comparable parts numbered with the corresponding part number in FIG. 11A. The difference is that the autotransformer 130b has taps 138b and 140b a few turns from the ends of the winding connected to lines 125b and 128b and the leads to the filaments 134b and 136b connect to the end terminals of the transformer rather than the taps on the winding. The operation of the circuits of FIGS. 11B and 11C is essentially the same as described for the circuit of FIG. 11A.

Figure 12:
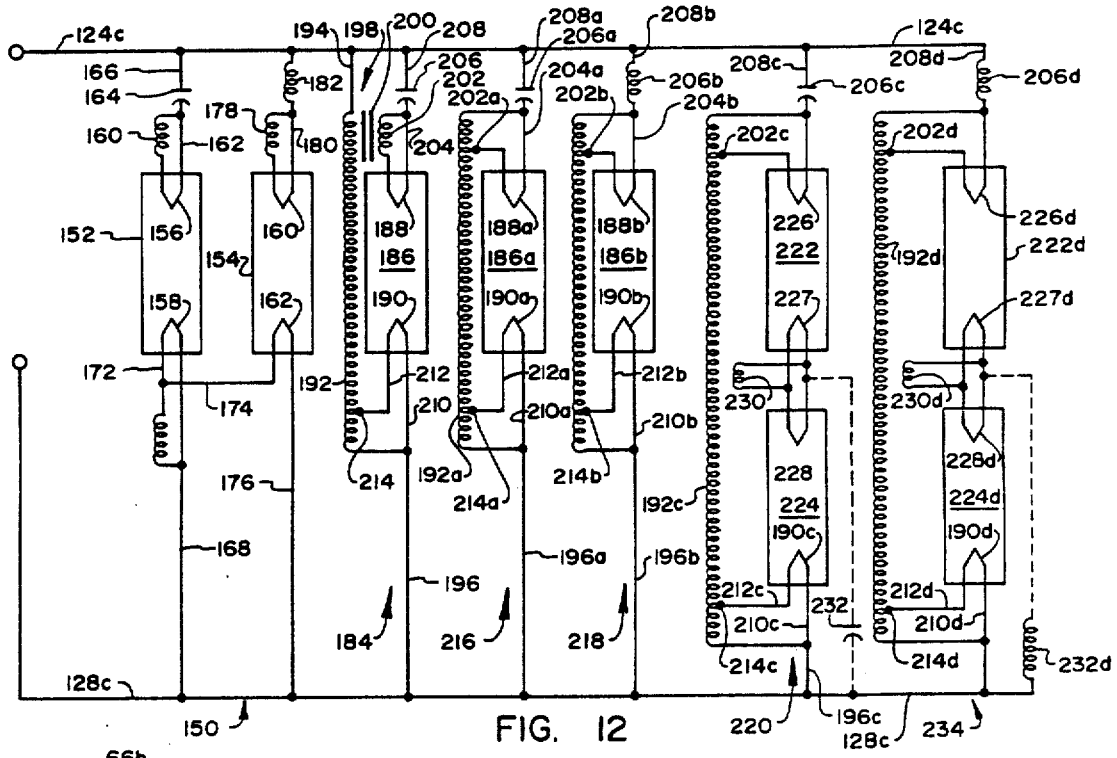
FIG. 12 illustrates ways for connecting a plurality of lamps across the high-frequency, high-voltage lines from an inverter using both capacitor and inductor ballasts so as to obtain a favorable power factor in the high frequency supply lines.

FIG. 12 illustrates a number of circuits for providing heating current to lamp filaments from the high frequency AC output lines 124c and 128c from an inverter, e.g., such as 120 in FIG. 11A.

The first circuit 150 in FIG. 12 comprises a pair of fluorescent lamps 152 and 154 in parallel across lines 124c and 128c through various means for heating the cathodes 156 and 158 in lamp 152 and the cathodes 160 and 162 in lamp 154. The heating means for filament 156 comprises an inductance winding 160 connected at one end to one end of the filament 156 and at the other end to a line 162 which connects at one end to the other end of the aforesaid filament 156 and at the other end to the junction of the connection of the winding 160 to it and one terminal of a capacitor 164. The other terminal of capacitor 164 is connected by line 166 to line 124c. Filament 158 of lamp 152 has one end connected directly to line 128c by a line 168. The other end of filament 158 is connected to one end of an inductance winding 170 by a line 172. The other end of winding 170 is connected to line 168. Filament 162 of lamp 154 is connected at one end by a line 174 to line 172 and at the other end by line 176 to line 128c. Filament 160 of lamp 154 has the same connections to line 124c as filament 156 of lamp 152 except that an inductance 182 replaces capacitor 164 and winding 178 replaces winding 160, parts 164 and 182 serving as ballast for the lamps. The mixing of capacitor and inductor ballasts maintains high power factor at the output of the inverter. Windings 160, 170 and 178 are all on the main inverter transformer and supply constant heating power. This circuit is adapted to supply full line voltage of lines 124c and 128c across both lamps 152 and 154 at the start of lamp operation (as do the circuits of FIGS. 11A and 11C), but to reduce the voltage substantially during operation by the voltage drops across ballast capacitor 164 and ballast inductor 182.

The second circuit 184 comprises a single fluorescent lamp 186 having a filament 188 at one end and a filament 190 at the other end. It receives constant filament power from an intermediate autotransformer 192 connected across lines 124c and 128c by lines 194 and 196, respectively. Filament 188 is supplied with heating current by a transformer 198 having a high frequency core 200, e.g., ferrite. One end of the autotransformer winding 192 forms the primary of transformer 198. The secondary is a winding 202 connected at one end to one end of the filament 188 and at the other end to a line 204 which is connected at one end to the other end of the filament 188 and at the other end to the junction of said connection of winding 202 to line 204 and one terminal of a ballast capacitor 206. The other terminal of capacitor 206 is connected by line 208 to line 124c. Filament 190 has one end connected by line 210 to line 196 and the other end connected by line 212 to a tap 214 on autotransformer winding 192.

The third circuit 216 bears the same reference numbers to parts corresponding to circuit 184 with postscript a and is the same as the second circuit 184, except that the separate transformer 198 is eliminated by using a few turns of the autotransformer circuit at both ends, e.g., by connecting the one end of filament 188a to a tap 202 on the winding 192a a few turns from the end. The filaments of lamp 186a receive variable power from this circuit, i.e., the filament voltage is reduced after the lamp arc strikes.

The fourth circuit 218 is the same as circuit 216 except that the ballast capacitor 206a is replaced by a ballast inductance 206b. Other parts bear the same reference numbers as the corresponding parts in circuits 184 and 216 with a postscript b and need not be further described. The combination of capacitor 206a for ballast in circuit 216 with inductor 206b for ballast in circuit 218 gives high power factor.

The circuits 184, 216 and 218, as is true of all of the circuits, operate in essentially the same way, providing full voltage of the inverter to which lines 124c and 128c are connected across the lamp at the start and a much reduced voltage after it is operating steadily. In circuit 184, full voltage is applied to the filaments at all times, whereas in circuits 216 and 218, the voltage applied to the filaments is automatically reduced when the voltage across the lamps decreases.

The fifth circuit 220 comprises two fluorescent lamps 222 and 224 in series across lines 124c and 128c and are served by a single filament transformer 192c. Lamp 222 has one filament 226 connected at one end to a tap 202c on autotransformer winding 192c, as in circuit 216, and at the other end to the end of transformer winding 192c, and through capacitor 206c and line 208c to line 124b. Filaments 190c at one end of tube 228c is connected at one end to tap 214c on transformer winding 192c a few turns from the end, and at the other end by lines 210c and 196c to line 128c. The adjacent end filaments 227 and 228 of lamps 222 and 224, respectively, are connected in parallel across the terminals of a short winding 230 forming a secondary of a transformer of which the primary is winding 192c. Optionally, a small capacitor 232 (or inductor) connected across lamp 224 (or across lamp 222 instead) may be used to aid starting and reduce the need for higher voltage for good operation.

The sixth circuit 234 is the same as circuit 220 except that capacitors 206c and 232 are replaced by inductances 206d and 232d, respectively. Other parts of circuit 234 have the same reference numbers as the corresponding parts of circuit 220 with the postscript d and need not be further described.

Circuits 220 and 234 operate in essentially the same manner as circuits 216 and 218 except that there are two lamps in series in circuits 220 and 234 instead of a single lamp in circuits 216 and 218.

FIG. 12 shows the great versatility of the circuits of the invention to modification without changing the principle of operation to operate with constant filament voltage or to achieve voltage reduction, across the filaments of lamps, with consequent reduction of heating current during operation after a maximum voltage start up, and with high power factor.

Figure 13A:
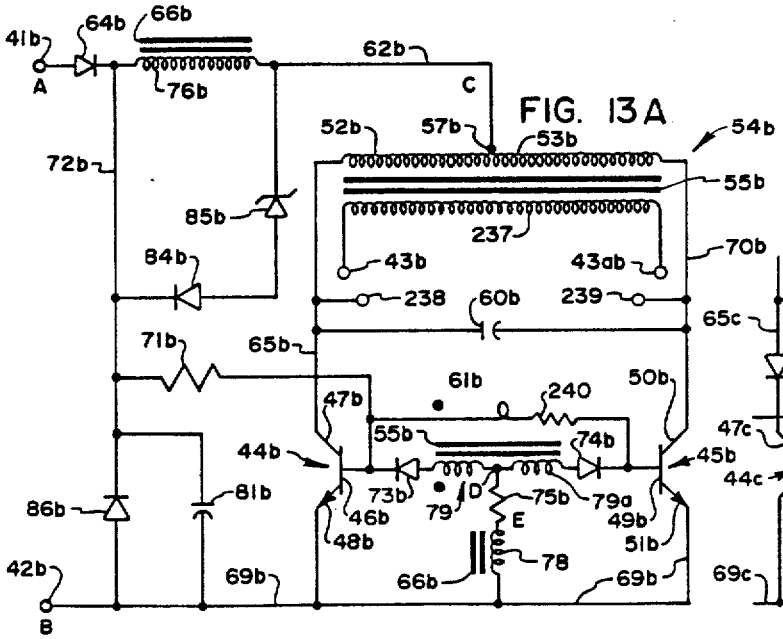
FIG. 13A is a circuit diagram of an inverter circuit similar to that of FIG. 6 but with modified means to supply the bases of the two transistors.

FIG. 13A depicts a circuit for an inverter similar to the inverter circuit shown in FIG. 6, showing only parts necessary to understand the circuit and its operation, but with a modified means to supply the bases of transistors 44 and 45. The parts of the circuit of FIG. 13A which correspond to parts of the circuit of FIG. 6 are given the same numbers with a postscript b and need not be described further.

A small electric current enters the circuit at terminal 41b and flows through line 72b and resistor 71b into the base of either transistor 44b or 45b or both. Resistor 71b has a high resistance, e.g., about 100 kilohms, so that the current flowing through it is a very small initial bias current to assure reliable starting. At least one of the transistors turns on and allows current to flow from terminal 41b through inductor 76b, center tap 57b and alternately through the primary windings 52b and 53b of the main inverter transformer 54b. A voltage is thus applied to coil 52b, 53b, and this induces a voltage in the low-voltage feedback winding 61b on the same core 55b (although not shown in the same location in FIG. 13A). One terminal of winding 61b is connected to base 46b of transistor 44b. The other terminal of winding 61b is connected to base 49b of transistor 45b, preferably through a resistor 240. Polarity of the feedback is such as to reinforce whatever the transistors are doing. That is, if 44b initially conducts more heavily than 45b, the feedback signal will tend to turn 44b on still more, and 45b will be turned off. Capacitor 60b resonates with 52b, 53b, and causes the voltage polarity to reverse periodically in all of the windings on 54b. First one transistor conducts and then the other. Winding 76b maintains a constant current through itself; therefore, the sum of the two transistor collector currents must be constant. In the transition interval when switching from one transistor to the other, and when both transistors are partly turned on and winding 52b, 53b is shorted, 76b assures that excessive current will [now] *not* flow.

Voltage is induced also in the feedback windings 79 and 79a, also on core 55b, and when oscillations build up enough that this voltage can turn on diodes 73b and 74b, most of the transistor base current is supplied from this new source. It is far more efficient to obtain base current from two turns on 79 and 79a than from the 120 volt input source. Only about 1.2 mA of base current flows through resistor 71b, while about 80 mA comes from 79 and 79a. This arrangement saves about 9 watts. Diodes 73b and 74b have other important functions. They, of course, force the starting current from 71b to flow into the transistor bases instead of being drained away from resistor 75b. Diodes 73b and 74b also connect both relatively high voltage feedback windings 79 and 79a between both bases at the switching time to provide a large feedback signal to assure fast switching and very rapid turn off for one transistor and rapid turn on for the other. Diodes 73b and 74b are slow diodes having a longer charge storage time than the transistors 44b and 45b. Thus while one diode conducts normally, the other will conduct backward for a short time until the transistor to which it is connected is fully turned off. However, before the base is driven too far negative, that diode will cease to conduct, and the base can drop only as far as allowed by the low-voltage feedback winding 61b, (e.g., to about −4.5 volts.).

The voltage at point D, the common junction of windings 79 and 79a with resistor 75b has a negative DC component of about 4.5 volts with respect to point B (or terminal 42b) and an AC component consisting of a train of half-sine waves. It turns out that the AC component at point D has the same waveform as that at point C, the center tap 57b, except for polarity and amplitude. The AC component at point C appears across winding 76b. By adding a second winding 78, of very few turns on the same core 66b, and connecting it as shown, the AC component of voltage at point E (between resistor 75b and winding 78) can be made almost exactly the same as that at point D. The potential across resistor 75b is therefore almost a pure 4.5 V DC voltage, and a constant current of about 80 mA flows up through resistor 75b and into one base or the other of transistors 44b and 45b. Since the sum of the collector currents is held constant by inductance 76b, it is proper and efficient to have the sum of the base currents constant also.

If the voltage at point C ever rises sufficiently far [about] *above* point B, Zener diode 85b turns on and prevents further rise to protect the [transitors] *transistors*. Abnormally high voltage can occur at point C for a few cycles at turn on. Diode 84b prevents 85b from conducting when the voltage at C drops below that at A as happens in normal operation.

Diode 86b functions only at turn off to allow a discharge path for current in winding 76b.

Capacitor 81b helps to reduce radio noise conducted back into the DC supply line. Inductance 76b is also very effective in this regard although that is not its main function.

The main output terminals are 43b and 43ab at the ends of secondary winding 237a of transformer 54b. If desired, auxiliary output terminals 238 and 239 may be provided at the remote or outer ends of windings 52b and 53b.

Lamps may be connected to terminals 43b and 43ab, or alternatively to terminals 238 and 239, in the circuit of FIG. 13 in essentially the same manner shown for lamps 67 in FIG. 6, using either ballast capacitors or inductances or both.

Each lamp or pair of lamps operates independently from the others and each has its own ballast inductor or capacitor. By using both inductors and capacitors, the reactive effects cancel so far as the inverter is concerned. The load power factor is therefore high, and the inverter frequency is relatively independent of the load in case some of the lamps are removed.

Air gaps are used with both inductors or transformers 54b and 76b and also with the ballast inductors. A DC input voltage of about 120 V was selected because of the commercial availability of switches and circuit breakers of this rating, and this also permits incandescent lamps to be run from the same circuit.

Lamp filaments can be powered in the circuit of FIG. 13 from 1-turn windings on the core of transformer 54b, the same as in FIG. 6. One winding can serve one end of all the lamps which may be connected together, but individual windings are needed at the ballast ends. Alternatively, one or more separate filament transformers can be used to reduce the number of wires to lamps not contained in the same fixture with the inverter.

Figure 13B:
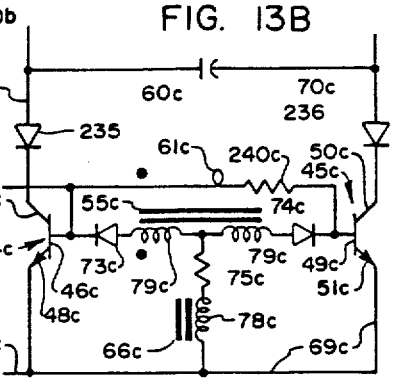
FIG. 13B is a diagram of a portion of the circuit of FIG. 13A modified by the addition of a diode in the line connecting each collector of the transistors with the transformer.

FIG. 13B is a circuit diagram of a portion of the circuit of FIG. 13A in which parts common to both circuits are numbered with the same numbers used in FIG. 13A but with postscripts c. The circuit of FIG. 13B is modified from that of FIG. 13A by the addition of a diode 235 in line 65c and a diode 236 in line 70c which serve to assure the absence of any reverse flow of current in lines 65c and 70c.

Figure 14:
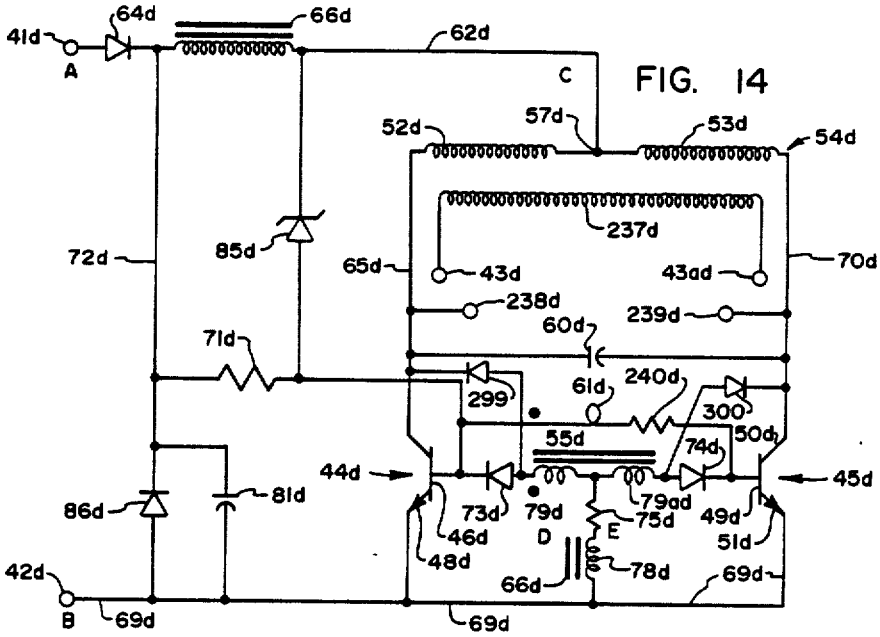
FIGS. 14 and 15 each show a different connection of the anode of the zener diode of FIG. 13A into the circuit.
Figure 15:
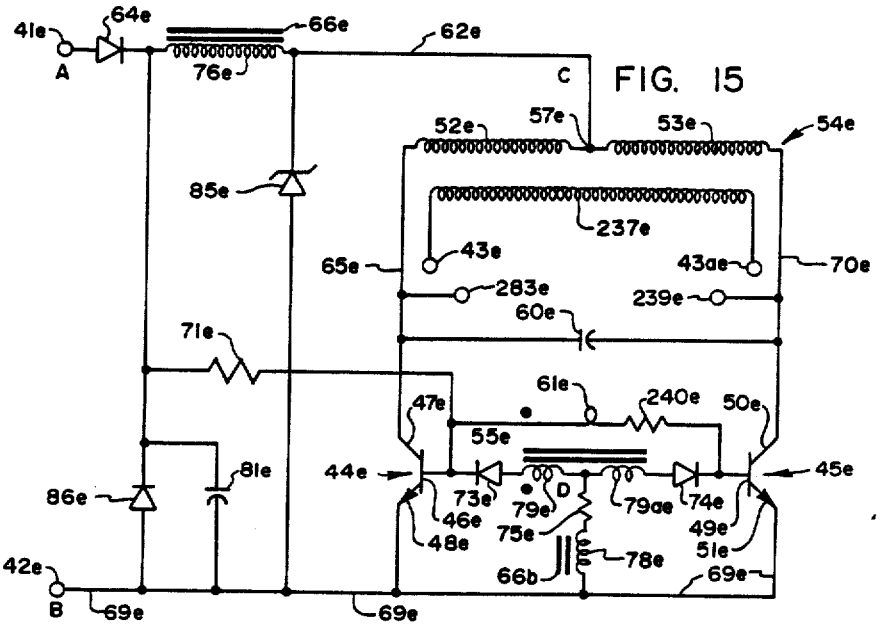

FIGS. 14 and 15 are circuit diagrams of inverter circuits similar to the inverter circuit depicted in FIG. 13A in which parts comparable to those in the circuit of FIG. 13A bear the same reference numbers with postscripts d and e, respectively. One difference between the circuits of FIGS. 13A, 14 and 15 is the connection of the anode of the Zener diode into the circuit. This diode is designated 85b in FIG. 13A, 85d in FIG. 14 and 85e in FIG. 15. In the circuit of FIG. 13A the connection of the anode of Zener diode 85b into the circuit is to line 72b through diode 84b. In the circuit of FIG. 14 the connection of the anode Zener diode 85d is to the bases of the transistors either directly to base 46d of transistor 44d or through winding 61d and resistor 240d to the base 49d of transistor 45d. In the circuit of FIG. 15 the connection of the anode of Zener diode 85e is directly to line 69e. The connection in the circuit of FIG. 13A of line 62b to line 72d through Zener diode 85b and 84d causes the input DC voltage (120 V) to be added to the conduction voltage of Zener diode 85b which should be designed to conduct at about 120 V for the required 240 volts maximum at point C. In the circuits of FIGS. 14 and 15 diodes 85d and 85e must conduct at about 240 volts. Diode 84b in the circuit of FIG. 13A prevents Zener diode 85b from conducting when the cathode of diode 85b drops below 120 volts as it [periodiclly] *periodically* does in normal operation. The direct connection of the anode of Zener diode 85e to the negative input terminal 42e, as in the circuit of FIG. 15, is the most straightforward alternative, but requires a higher combination of voltage and current in diode 85e than do the connections of FIGS. 13A and 14.

The circuit of FIG. 14 has an additional difference from the circuits of FIGS. 13A and 15 as illustrated. This difference is the presence in the circuit of FIG. 14 of two additional diodes 299 and 300. The cathode of diode 299 is connected to collector 47d of transistor 44d and its anode is connected to the junction of the anode of diode 73d and feedback winding 79d. Similarly the cathode of diode 300 is connected to collector 50d of transistor 45d and its anode is connected to the junction of the anode of diode 74d and feedback winding 79ad. With diodes 299 and 300 in the circuit, the resistance rating of resistor 75d can be selected to provide all the base current needed to drive very low gain transistors, and the excess base current not needed by transistors of normal or high gain is shunted by diodes 299 and 300 (hence catching diodes) away from the base to the collector of either transistor as that transistor approaches saturation. The result is [than] *that* the transistors do not quite saturate and can be turned off more quickly that if allowed to saturate heavily. Diodes 299 and 300 may, therefore, serve as well to adjust the inverter to accommodate transistors differing greatly in current gain. While diodes 299 and 300 are shown only in the circuit of FIG. 14, they may also be used in the circuits of FIGS. 13A, 13B and/or 15 if the benefits described by reason of their presence in the circuit of FIG. 14 are desired in any one or more of these circuits.

The operation of the circuit of FIGS. 13A, 14 and 15 will be described by reference to the circuit of FIG. 14. Connection of the anode of Zener diode 85d to the base of either transistor 44d or 45d causes at least one of these transistors to turn on heavily when diode 85d turns on. Current flowing through the collectors of the transistors 44d and 45d can limit their collector voltages as effectively as current through Zener diode 85d but with the advantage that the transistors 44d and 45d are capable of conducting much larger currents than the Zener diode 85d needs to conduct in this situation. Thus by using the Zener diode 85d to turn on the transistors 44d and 45d, a relatively low-current and inexpensive Zener diode may be used.

The drive circuit for the transistors 44d and 45d represents a significant improvement over circuits known in the prior art. Two independent feedback windings 79d and 79ad of the main inverter transformer 54d are used to satisfy conflicting requirements in an optimum way. It is desirable to have a large feedback voltage during the switching time to turn one transistor off and the other on with a minimum of overlap time when both transistors are partially on. However, a sufficiently large feedback voltage for this purpose causes too much reverse base voltage for the turned-off transistor between switching events.

A small current from the +DC source 41d flows through resistor 71d to supply a very small amount of bias current for the bases of the transistors 44d and 45d. This is sufficient to cause the transistors to begin to oscillate in the conventional way, i.e., the outputs of the collectors of both transistors are connected to transformer 54d by windings 52d and 53d which in turn are coupled magnetically to the transistor bases 46d and 49d by way of the low-voltage feedback winding 61d on the core of the same transformer. Feedback polarity is such as to reinforce and sustain an oscillating condition, with each transistor in turn causing current to flow from the positive DC voltage source 41d through inductor 76d, line 62d and then through either winding 52d or 53d of transformer 54d, and returning to the negative power supply terminal 42d.

When the amplitude of oscillation increases sufficiently, diodes 73d and 74d are turned on and off alternatively by voltage induced in high-voltage feedback winding 79d or 79ad. Base current is increased very substantially by current from winding 79d or 79ad and the bases are driven efficiently at this time primarily from this source. Although the voltage of windings 79d and 79ad is high compared to the voltage of winding 61d, it is still small compared to the input voltage at terminals 41d and 42d, which means that base current is obtained more efficiently from windings 79d and 79ad than from the high-resistance dropping resistor 71d.

Diodes 73d and 74d are inexpensive, low-voltage slow diodes which have a larger charge storage time than the transistor bases 46d and 49d. This means that when the anode of either diode 73d or 74d goes negative with respect to the cathode, that diode will not immediately turn off but will conduct backward and withdraw all of the stored charge in the base of the transistor connected [threreto] *thereto*. The other diode has already turned on [oven] *even* sooner. Thus, during this critical switching time, the high voltages of feedback windings 79d and 79ad are connected directly to both bases through very low-impedance diodes 73d and 74d, and the low-voltage winding is effectively isolated by the relatively higher resistance of resistor 240d. Before the voltage of the base of the turning-off transistor drops below a safe value, the associated diode runs out of stored charge (while also driving current through resistor 240d) and turns off. The peak negative base voltage is therefore determined only by the low-voltage winding 61d, as desired. Current flowing through the collectors 47d and 50d of the transistors 44d and 45d, respectively, can limit their collector voltages as effectively as current through Zener diode 85d but with the advantage that the transistors are capable of conducting much larger currents than the Zener diode 85d needs to conduct in this circuit. Thus by using the Zener diode 85d to turn the transistors on, a relatively low current and inexpensive Zener diode may be used.

Figure 16:
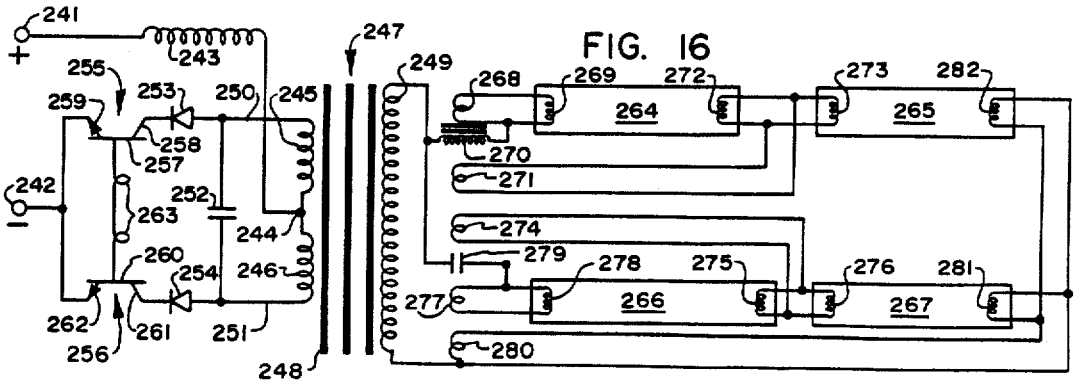
FIG. 16 is a diagram of the circuit connecting the inverter to two pairs of series connected fluorescent lamps with means for heating the filaments of all lamps and utilizing both capacitor and inductor ballasts for high power factor at the inverter output.

FIG. 16 depicts a circuit connecting essential parts of an inverter to two pairs of series connected fluorescent lamps with means for heating the filaments of all lamps and using both capacitor and inductor ballasts for high power factor. Terminal 241 connects the inverter to the positive terminal and terminal 242 connects it to the negative terminal of a power supply line (not shown). Current flowing into the inverter from terminal 241 flows through winding 243, which is analogous to winding 76 in the circuit of FIG. 6, to the center tap 244 of the two windings 245 and 246 of the primary of a transformer 247 having a magnetic core, e.g., a ferrite core 248. The transformer 247 has a main secondary winding 249 and a number of short winding secondaries later to be described. The free end terminal of winding 245 connects with line 250 and the free end terminal of winding 246 connects to a line 251. A capacitor 252, analogous to capacitor 60 in FIG. 6, is connected at one terminal to line 250 and at the other terminal to line 251. Line 250 also connects through diode 253 to transistor 255. Similarly line 251 connects through diode 254 to transistor 256. Transistor 255 has a base 257, a collector 258 to which diode 253 is connected, and an emitter 259. Transistor 256 has a base 260, a collector 261 to which diode 254 is connected, and an emitter 262. The bases are fed by a low voltage secondary 263 on core 248 of transformer 247, i.e., they are feedback windings of a very few turns, e.g., two turns. Emitters 259 and 262 are connected together to the negative terminal 242 referred to above.

Lamps 264 and 265 are connected in series in the output circuit of the [inventer] *inverter* as also are lamps 266 and 267. A short secondary winding 268 on the core 248 of transformer 247 supplies heating current for filament 269 at a first end of lamp 264. Ballast for lamps 264 and 265 is provided by inductor 270 which is connected at one terminal to one terminal of secondary winding 249 and at the other terminal to the line connecting winding 268 to filament 269, as shown. Another short secondary winding 271 on core 248 supplies filament heating current to filament 272 at the second end of lamp 264 and to filament 273 at a first end of lamp 265. A still further short winding secondary 274 on core 248 supplies filament heating current to filament 275 at the second end of lamp 266 and the filament 276 at the first end of lamp 267. An additional short winding secondary 277 on core 248 supplies filament heating current to the filament 278 at the first end of tube 266. Lamps 266 and 267 have a capacitor ballast 279 which is connected at one terminal to the line connecting winding 277 to filament 278 and at the other terminal to the same terminal of secondary 249 as inductor 270. A final short winding secondary 280 connected at one end to the other terminal of secondary winding 249 and at the other end to filament 281 at the second end of lamp 267 and to filament 282 at the second end of lamp 265, putting these two filaments in parallel across the lines from winding 280. The operation of this circuit is clear in the light of the explanation of other inverter output circuits hereinabove and need not be repeated. The combination of inductor and capacitor ballasts in the circuit provide high power factor in the inductor output circuit.

Figure 17:
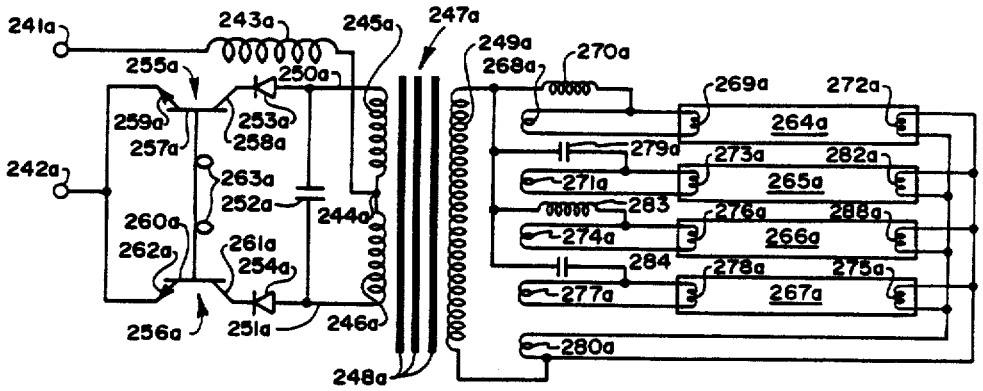
FIG. 17 is a diagram of the circuit connecting the inverter to four lamps in parallel with means for heating the filaments of all the lamps and utilizing both capacitor and inductor ballasts for high power factor at the inverter output.

The circuit illustrated in FIG. 17 is similar to the circuit of FIG. 16 just described except that the four lamps are in parallel instead of two pairs in series. Parts in the circuit of FIG. 17 which are comparable to parts in the circuit of FIG. 16 are given the same reference numbers with a postscript a. The inverter components and their connections to each other are the same as the components of the inverter in the circuit of FIG. 16. One terminal of secondary winding 249a is connected in parallel (a) through a ballast inductor 270a to the line connecting short winding secondary 268a to filament 269a at the first end of lamp 264a, (b) through a ballast capacitor 279a to the line connecting short winding secondary 271a with filament 273a at the first end of lamp 265a, (c) through a ballast inductor 283 to the line connecting short winding secondary 274a to the filament 276a at the first end of lamp 266a, and (d) through a ballast capacitor 284 to the line connecting short winding secondary 277a to the filament 278a at the first end of lamp 267a. Short winding secondary 280a has one terminal connected to the second terminal of secondary winding 249a and the two lines from winding 280a are connected in parallel to the filaments 272a, 282a, 288a and 275a at the second ends of tubes 264a, 265, 266a and 267a, respectively. Operation of this circuit is obvious from the descriptions of output circuits of inverters hereinabove. Again the combination of inductor and capacitor ballasts in the inverter output circuit for the tubes, as shown and described, assures high power factor in the output circuit.

Figure 18:
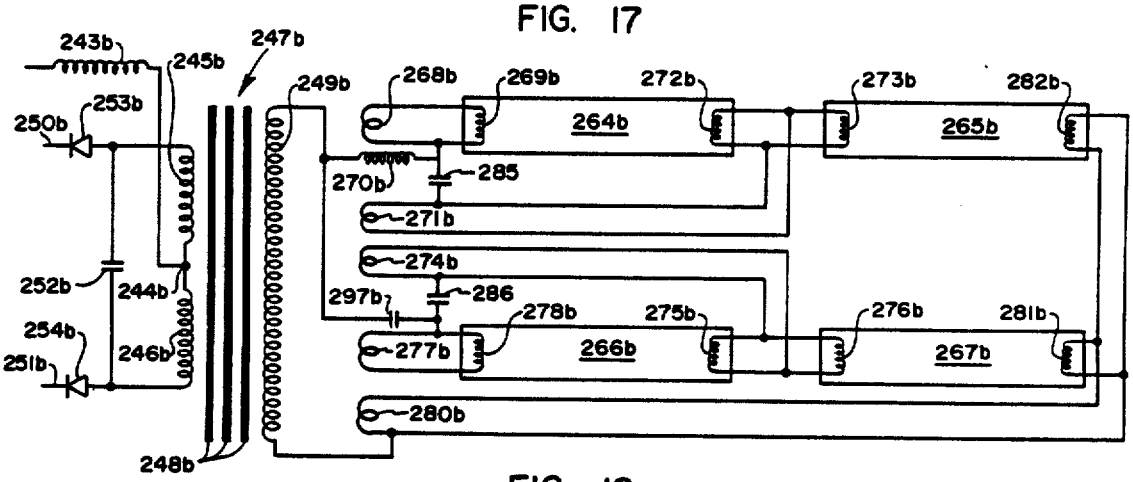
FIG. 18 is a diagram of the circuit of FIG. 16 with the addition of starting aids for the pairs of series connected lamps.

FIG. 18 shows a modification of the circuit of FIG. 16 with the addition of starting aids for the two pairs of series connected fluorescent lamps. The inverter circuit of FIG. 18 is the same as the inverter circuit of FIG. 16 and the parts in the circuit of FIG. 18 corresponding to parts in the inverter circuit of FIG. 16 bear the same reference numbers with a postscript b. The output circuit of the inverter of FIG. 19 is the same as the output circuit of the inverter of FIG. 16 with the addition of the starting aids 285 and 286 and the reference numbers are the same in FIG. 19 as in FIG. 16 with the addition of postscripts b. The starting aid 285 is a capacitor having one terminal connected (a) to the line from short winding 268b to filament 269b and (b) to the inductor 270b and the other terminal connected to the line connecting short winding 271b with filaments 272b and 273b. The starting aid 286 is a capacitor having one terminal connected (a) to the line from short winding 277b to filament 277b and (b) to the capacitor 279b and the other terminal connected to the line connecting short winding 277b to filament 268b. These starting aids have the characteristic of reducing the starting voltage required to strike the arc between the cathodes (filaments) at the first and second ends of the lamps.

Figure 19:
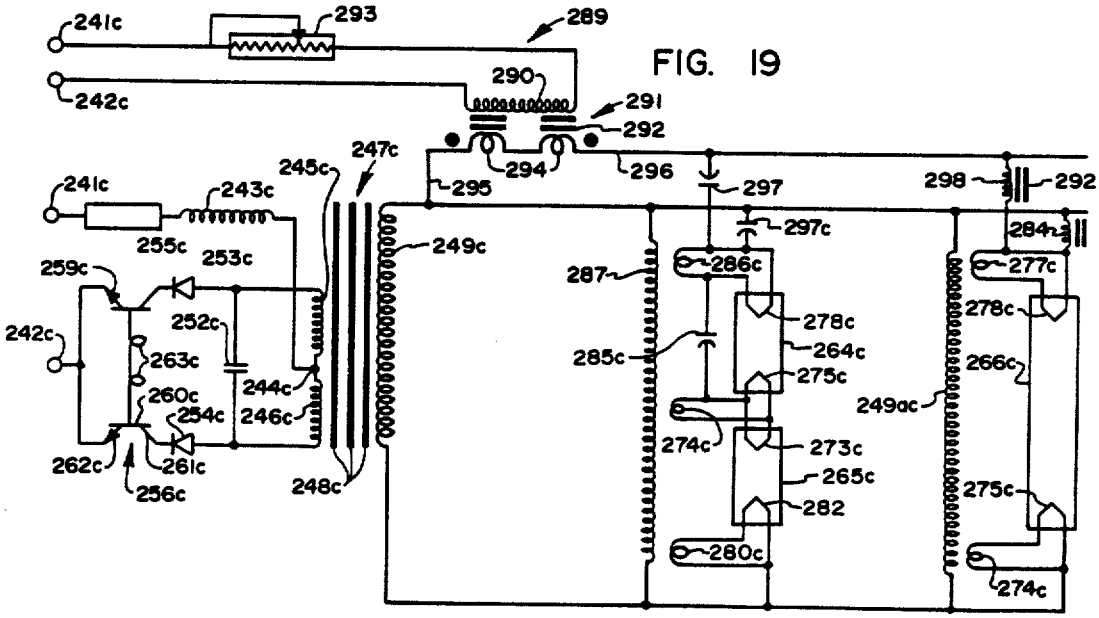
FIG. 19 is a diagram of the connection of the inverter to a plurality of lamps in series and parallel across the lines from the high-frequency, high-voltage secondary of the transformer and including a saturable reactor for dimming lamps.

FIG. 19 [despicts] *depicts* a circuit comprising an inverter like the inverter of FIG. 16 and an inverter output circuit. Components in the circuit of FIG. 19 have been given the same reference numbers as [corresponsing] *corresponding* parts in the circuit of FIG. [1161] *16* with a postscript c. The output circuit of FIG. 19 includes three fluorescent lamps 264c, 265c and 266c, 264c and 265c being connected in series and then connected in parallel with lamp 265c across the terminals of secondary winding 249c of the inverter transformer 247c. The series connected lamps have a capacitor ballast 279c between the line connecting short winding 268c with filament 278c and the terminal of secondary winding 249c. The short windings 268c, 274c and 280c have voltage induced in them from primary 287 which receives voltage from winding 249c of the inverter transformer 247c. An auxiliary circuit 289 comprising in series a primary winding 290 of a saturable reactor 291 having a magnetic core, e.g., ferrite, and a [resister] *resistor* 293 connected to the DC terminals 241c and 242c. The secondary of reactor 291 is a short winding 294 having one terminal connected by line 295 to one terminal of inverter transformer 247c and by line 296 to a capacitor 297 connected to the line connecting short winding 268c with filament 278c, and to an inductor 298 on core 292 connected to the line connecting short winding 277c with filament 278c.

Ballast capacitor 279c and ballast inductor 284 conduct small currents to their respective lamps for very dim operation. Additional current flows through ballast capacitor 297 and ballast inductor 298 by way of the saturable reactor windings 294 for brighter operation. The amount of additional current is controlled by the DC current in winding 290 of the saturable reactor which DC current, in turn, is controlled manually or automatically by means of the variable resistor 293. In this manner, the light [internsity] *intensity* may be changed in response to varying needs.

The circuits of the invention, and in particular the electronic ballast circuits have great benefit to the utility industry because of its efficiency which make it possible to save capital investment. The invention has great value also to users of electric power for lighting because of great savings that can be made in consumption of electric power.

Fluorescent lamps operate more efficiently on high frequencies than they do on commercially available AC of 50 to 60 Hz., a fact that the art has recognized for many years, as the discussion of the prior art hereinabove states. Despite this recognition there is not available on the market either a system having the advantages of the present affordable, safe, economic, reliable, efficient and flexible system for operating at high frequencies, e.g., in the range of 20 to 30 kHz or higher, nor a ballast that combines safe, economic, reliable, efficient and flexible use in present fluorescent installations and particularly as part of a system powered from a three-phase source. The system and ballast of the invention make use of the enhanced efficiency allowed by high frequency in the range of 20 to 30 kHz, keep the power loss to a practical minimum in the inverter and ballast, keep the costs low, obtain high power factor (e.g., at least 90%), provide reliability by avoiding the use of components like electrolytic capacitors and by using a minimum number of parts, obtain low acoustic noise, low radio noise and low flicker.

The inverter may be described as a symmetrical, class B, push-pull, current-limited, [turned-collector] *tuned-collector*, sinusoidal oscillator. It is self starting, highly efficient and stable over a wide range of input voltage without squegging at any voltage, with or without load.

While the system and ballast have been described and illustrated with many modifications and embodiments, those skilled in the art will recognize that further modifications and embodiments may be made within the ambit of the disclosure and claims without departing from the principles of the invention disclosed.

Having thus described and illustrated the invention, what is claimed is:

1. An electrical system for supplying a high frequency AC voltage to gas discharge lamps, said system comprising:

(a) rectifier means for converting an AC voltage to a rectified DC voltage, (b) inverter means having a pair of input terminals and a pair of output terminals, said inverter means coupled to the output of said rectifier means for converting said rectified DC voltage appearing across said pair of input terminals to a high frequency AC voltage across said pair of output terminals, said inverter means comprising:

(1) oscillator means comprising first and second switching transistors, each of said transistors having a base, collector and emitter, the emitters of said transistors connected to one of said pair of input terminals, (2) tuned circuit means, said tuned circuit means comprising a transformer having first and second series-connected inductive windings respectively connected to the output terminals and connected with the collectors of said transistors, a [feed back] *feedback* winding connecting the bases of said transistors, (3) inductor means connected between the other one of said pair of input terminals and a junction point intermediate said first and second inductive windings for limiting the current in the collectors of said first and second transistors during the time period of simultaneous conduction of said transistors, and (4) capacitor means coupled between said junction point and said feedback winding for increasing the switching *speed* of said first and second transistors by decreasing base current of the transistor that is turning off and increasing base current of the transistor that is turning on; and (c) means coupling at least one gas discharge lamp to the pair of output terminals of said inverter means.

2. An electrical system for supplying a high frequency AC voltage to gas discharge lamps, said system comprising:

(a) rectifier means for converting an AC voltage to a rectified DC voltage, (b) inverter means having a pair of input terminals and a pair of output terminals, said inverter means coupled to the output of said rectifier means for converting said rectified DC voltage appearing across said pair of input terminals to a high frequency AC voltage across said pair of output terminals, said inverter means comprising:

(1) oscillator means comprising first and second switching transistors, each of said transistors having a base, collector and emitter, the emitters of said transistors connected to one of said pair of input terminals, (2) transformer means comprising a pair of primary windings connected in series between the collectors of said transistors, a first feedback loop winding connecting the bases of said first and second transistors, and a second feedback loop winding connected by way of a pair of forward diodes to the base of each of said transistors, and (3) inductor means connected between the other one of said pair of input terminals and a junction point intermediate said pair of primary windings for limiting the collector current of said first and second transistors during the time period of simultaneous conduction of said transistors; and (c) means coupling at least one gas discharge lamp to the pair of output terminals of said inverter means.

3. The system as claimed in claim 2 further comprising a combination of a third winding in series with a resistor, said third winding-resistor combination being connected between one of the input terminals and an intermediate point of said second feedback loop winding.

*4. A high frequency AC lighting system for gas discharge lamps comprising:*

*a plurality of electrical fixtures for removably holding gas discharge lamps, each said fixture being distributed throughout an area which is to be lighted by said lamps;*

*one or more subcenters for receiving commercial AC power at available voltage and phase;*

*means at each said subcenter for rectifying said received AC power into DC power for distribution from said one or more subcenters to said plurality of lighting fixtures;*

*wiring means for distributing said DC power from said one or more subcenters to said fixtures; and*

*a plurality of inverting means for receiving said DC power at input terminals thereof and inverting said DC into high frequency AC at output terminals thereof, each of said inverting means being located at one of said fixtures, and being electrically connected at said output terminals to a plurality of said lamps, and each said inverting means comprising a semiconductor switching means in electrical connection with a transformer.*

*5. A system as set forth in claim 4 in which each said fixture comprises a ballast means electrically connected to said lamps held in said fixture, and in which each said inverting means is electrically connected to said ballast means of its own and a plurality of adjacent fixtures.*

*6. A system as set forth in claim 5 in which each said inverting means is connected to one or more ballast means of adjacent fixtures by two load-carrying wires.*

*7. A system as set forth in claims 5 or 6 in which said ballast means comprises an inductor.*

*8. A system as set forth in claims 5 or 6 in which said ballast means comprises a capacitor.*

*9. A system as set forth in claims 5 or 6 in which said ballast means comprises an inductor and a capacitor.*

*10. A system as set forth in claims 5 or 6 in which each said inverter means further comprises a pair of transistors in push-pull connection with a collector transformer.*

*11. A system as set forth in claim 10 in which each said fixture holds at least one gas discharge lamp comprising one or more filaments, and in which each said inverter means further comprises heater windings on said transformer, said heater windings being adapted to make electrical connection with said filaments of one or more said lamps.*

*12. A system as set forth in claim 11 in which said means for electrically connecting said output terminals of said inverter means comprises a separate magnetic core transformer and wherein said heater windings derive induction from said separate magnetic core.*

*13. A system as set forth in claim 4 further comprising energy-saving transformer means for deriving lamp filament voltage from, and proportional to, lamp arc voltage so as to reduce lamp filament power after arc voltage drops as said lamps turn fully on.*

*14. A system as set forth in claim 4 in which each said fixture holds at least one of said gas discharge lamps and each lamp comprises a filament, and in which each said inverting means is situated in a first fixture and is electrically connected to a second fixture, said second fixture comprising transformer means for heating the filament of each lamp in said second fixture, and said second fixture further comprising ballast means for each lamp in said second fixture.*

*15. A system as set forth in claim 4 in which the DC is delivered to each said inverting means by a two-wire circuit.*

*16. A system as set forth in claim 4 in which the DC is delivered to each said inverting means by a balanced three-wire circuit.*

*17. A system as set forth in claim 4 further comprising voltage transforming means for inputting said AC power to said rectifying means, and said voltage transforming means also comprising means for transforming said commercial AC to proper voltage for conventional AC facilities comprising at least one of (a) single phase output terminals, (b) three phase output terminals, and (c) six phase output terminals.*

*18. A high frequency AC lighting system system for gas discharge lamps comprising:*

*one or more subcenters for receiving commercial AC power at available voltage and phase;*

*means at said subcenter for rectifying said received AC power into DC power for distribution from said one or more subcenters;*

*a plurality of electrical fixtures for removably holding gas discharge lamps each comprising one or more filaments;*

*wiring means for distributing said DC power from said one or more subcenters to said fixtures;*

*inverting means associated with at least one said fixture, and receiving said DC power at input terminals thereof and inverting said DC into high frequency AC at output terminals thereof for connection to said lamp, said inverting means comprising a semiconductor switching means in electrical connection with a transformer; and*

*energy saving transformer means in parallel electrical connection across at least one said lamp, for deriving lamp filament voltage from, and proportional to, lamp arc voltage so as to reduce lamp filament power after arc voltage drops as said lamp turns fully on.*

* * * * *

UNITED STATES PATENT AND TRADEMARK OFFICE
CERTIFICATE OF CORRECTION

PATENT NO. : RE. 33,057

DATED : September 12, 1989

INVENTOR(S) : John C.CLEGG, etal

It is certified that error appears in the above-identified patent and that said Letters Patent is hereby corrected as shown below:

Column 1, line 54, "market place" should be --marketplace--
Column 2, line 17, after "secondary" insert --winding--
Column 2, line 28, after "primary" add --winding--
Column 2, line 29, after "secondary" insert --winding--
Column 3, line 31, before "current" insert --for distributing--
Column 6, line 8, before "that" insert --so--
Column 6, lines 36-37, "38 and 38" should be --38 and 39--
Column 7, line 39, "he" should be --the--
Column 13, line 43, "before the" should be --before they--
Column 14, line 38, after "inverter" insert --.--

Signed and Sealed this

Twenty-fourth Day of November, 1992

*Attest:*

DOUGLAS B. COMER

*Attesting Officer*

*Acting Commissioner of Patents and Trademarks*